(12) United States Patent
Ito

(10) Patent No.: US 7,057,160 B2
(45) Date of Patent: Jun. 6, 2006

(54) OPTICAL ENCODER AND OUTPUT ADJUSTMENT FOR THE SAME

(75) Inventor: Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 184 days.

(21) Appl. No.: 10/771,787

(22) Filed: Feb. 4, 2004

(65) Prior Publication Data

US 2004/0155178 A1    Aug. 12, 2004

(30) Foreign Application Priority Data

Feb. 7, 2003    (JP) ............................. 2003-030875

(51) Int. Cl.
*G01D 5/34*    (2006.01)

(52) U.S. Cl. ................................................ 250/231.13

(58) Field of Classification Search ...................... None
See application file for complete search history.

(56) References Cited

U.S. PATENT DOCUMENTS 5,026,164 A    6/1991  Ichikawa

2002/0014581 A1*    2/2002  Yamamoto et al. .... 250/231.13
2005/0157307 A1*    7/2005  Yamamoto et al. ......... 356/499

FOREIGN PATENT DOCUMENTS

JP    2002-48602    2/2002

* cited by examiner

*Primary Examiner*—Stephone B. Allen
*Assistant Examiner*—Suezu Ellis
(74) *Attorney, Agent, or Firm*—Scully, Scott, Murphy & Presser, P.C.

(57) ABSTRACT

An optical encoder comprises a light source unit, a scale which has a periodic optical pattern and displaces relatively to the light source unit, and a light detector to detect a light beam emitted from a light source of the light source unit and traveled by way of the scale. The light source unit has a light beam exit opening through which a light beam is emitted toward the scale. Assuming that z1 is a distance between the light beam exit opening and the scale, z2 is a distance between the scale and the light detector, and p1 is a pitch of the periodic optical pattern of the scale, the width W of the light beam exit opening in the scale moving direction is determined depending on the values of z1, z2, and p1.

22 Claims, 13 Drawing Sheets

OPTICAL ENCODER AND OUTPUT ADJUSTMENT FOR THE SAME

CROSS-REFERENCE TO RELATED APPLICATIONS

This application is based upon and claims the benefit of priority from the prior Japanese Patent Application No. 2003-030875, filed Feb. 7, 2003, the entire contents of which are incorporated herein by reference.

BACKGROUND OF THE INVENTION

1. Field of the Invention

The present invention relates to an optical encoder and a method of adjusting its output signal level.

2. Description of the Related Art

Encoders are used for detecting displacement in the linear direction in machine tool stages and three-dimensional measuring instruments. Optical and magnetic encoders are also used for detecting a rotational angle of servo motors and the like.

An optical encoder is generally composed of a scale fixed to a member for detecting displacement of a stage or the like, and a sensor head for detecting displacement of the scale. The sensor head includes a light source for emitting light to the scale, and a light detector for detecting a light beam transmitted, reflected or diffracted from the scale, and the movement of the scale is detected by change of the received light signal.

As a prior art, a representative optical encoder is explained by referring to FIG. 23. FIG. 23 is a block diagram showing a laser encoder of a prior art using a surface-emitting laser and a reflection type scale.

Such a laser encoder using a surface-emitting laser and a reflection type scale is disclosed, for example, in Jpn. Pat. Appln. KOKAI Publication No. 2002-48602.

This encoder is composed of a reflection type scale 20 and a sensor head 30 as shown in FIG. 23. An optical pattern 23 for detecting a moving distance is formed on a surface of the scale 20, and this pattern is made by patterning a member of high reflectivity made of an aluminum or the like on a surface of a transparent member of glass or the like. The sensor head 30 has a light detector 37 for detecting the moving distance formed on a semiconductor substrate 34, and a coherent light source (hereinafter called light source) 321 for detecting the moving distance disposed on the semiconductor substrate 34. The relative positional relation of the light source 321 and the light detector 37 is kept constant.

The scale 20 cooperates with a stage (not shown), and moves in the arrow direction in FIG. 23 relatively to the sensor head 30, and the sensor head 30 detects its moving distance by the change of intensity of a diffracted light from the scale 20. The detection signal of the moving distance is produced as a waveform as shown, for example, in FIG. 24. Herein, phase A and phase B are waveforms produced along with the movement of the scale 20, are generally quasi sinusoidal waves. Phase A and phase B are outputs different in phase by 90 degrees, and from the relation in phase of signals of phase A and phase B, the moving direction of the scale 20 can be detected. The scale 20 changes its position while maintaining a positional relation capable of forming a so-called Talbot image relatively to the sensor head 30.

The Talbot image is explained by referring to FIG. 25. For the sake of simplicity of explanation, a transmission type encoder is assumed, and it is discussed same also in a reflection type encoder.

As shown in FIG. 25, parameters are defined as follows:

z1 is a distance between a light source 1 and a surface of a scale 2 having diffraction grating formed thereon;

z2 is a distance between the surface on the scale 2 having the diffraction grating formed thereon and a light detector 3;

p1 is a pitch of the diffraction grating on the scale 2; and p2 is a pitch of a diffraction interference pattern on a receiving surface of the light detector 3.

The "pitch of the diffraction grating on the scale 2" is a spatial period of an optical pattern modulated in optical characteristic and formed on the scale 2.

The "pitch of a diffraction interference pattern on a receiving surface of the light detector 3" is a spatial period of an intensity distribution (light intensity pattern) of the diffraction pattern formed on the receiving surface.

According to the diffraction theory of light, when the z1 and z2 defined above are in a specific relation satisfying the relation represented by the following formula (1), a light intensity pattern similar to the diffraction grating pattern of the scale 2, or so-called Talbot image, is formed on the receiving surface of the light detector 3:

$$(1/z1)+(1/z2)=\lambda/(k(p1)^2) \qquad (1)$$

where $\lambda$ is a wavelength of a light beam emitted from the light source 1; and k is a natural number.

At this time, the pitch p2 of the diffraction interference pattern on the receiving surface can be expressed by the following formula (2):

$$P2 = p1 \times (z1+z2)/z1 \qquad (2)$$

When the scale 2 displaces in the pitch direction of the diffraction grating relatively to the light source 1, the light intensity pattern of the diffraction interference pattern is moved in the dislocating direction of the scale 2 while keeping the same spatial period.

Therefore, when a spatial period p20 of the photo detector 4 of the light detector 3 is set in the same value as p2, every time the scale 2 moves in the pitch direction by distance of p1, a periodic intensity signal is obtained from the light detector 3, so that the displacement of the scale 2 in the pitch direction can be detected.

Back to FIG. 23, the light source 321 for detecting the moving distance, the optical pattern 23 for detecting the moving distance, and the photo detector of the light detector 37 are disposed in a positional relation capable of forming the Talbot image, and a light and dark pattern similar to the optical pattern 23 for detecting the moving distance formed on the scale 20 is projected on the photo detector of the light detector 37. The period of this light and dark pattern is the period p2 calculated by the formula (2). The photo detector on the light detector 37 is formed to have this period of p2, and with this photo detector, the movement of the light and dark pattern can be detected.

Since the optical encoder is high precision, high resolution, and contact-free type, and is excellent in electromagnetic wave interference tolerance, the optical encoder is used in wide fields, and in particular the optical type is in the mainstream in encoders demanding high precision and high resolution.

BRIEF SUMMARY OF THE INVENTION

The first phase of the present invention relates to an optical encoder comprising:

a light source unit;

a scale which has a periodic optical pattern and displaces relatively to the light source unit; and a light detector to detect a light beam emitted from a light source of the light source unit and traveled by way of the scale;

wherein the light source unit has a light beam exit opening through which a light beam is emitted toward the scale, and assuming that a distance between the light beam exit opening and the scale is z1, a distance between the scale and the light detector is z2, and a pitch of the periodic optical pattern of the scale is p1, the width W of the light beam exit opening in a scale moving direction is determined depending on the values of z1, z2, and p1.

The second phase of the present invention relates to the optical encoder according to the first phase, wherein the width W of the light beam exit opening in the scale moving direction is specified preferably as follows:

$$p1\times(2n-1.5)\times(z1+z2)/(2\times z2) \leq W \leq p1\times(2n-0.5)\times(z1+z2)/(2\times z2)$$

where n is a natural number.

The third phase of the present invention relates to the optical encoder according to the second phase, wherein the width W of the light beam exit opening in the scale moving direction is preferably represented approximately as follows:

$$p1\times(2n-1)\times(z1+z2)/(2\times z2).$$

The fourth phase of the present invention relates to the optical encoder according to the second phase, wherein the values of z1 and z2 are preferably substantially equal to each other.

The fifth phase of the present invention relates to the optical encoder according to the second phase, wherein one or more light beam exit openings are disposed in the scale moving direction preferably at a position of $(z1+z2)/z2\times m$ (where m is a natural number) times of the pitch pi of the periodic optical pattern of the scale.

1 The sixth phase of the present invention relates to the fifth phase, wherein the light beam exit opening of the light source unit is preferably a light beam exit window formed on a light beam emission surface of the light source, and the width W of the light beam exit opening in the scale moving direction is the width WLs of the light beam exit window in the scale moving direction.

The seventh phase of the present invention relates to the optical encoder according to the fifth phase, wherein the light beam exit opening of the light source unit is preferably an optical element disposed on an optical path of a light beam from the light source toward the scale and transmitting a predetermined portion of the light beam.

The eighth phase of the present invention relates to the optical encoder according to the seventh phase, wherein the light beam exit opening of the light source unit, the scale, and the light detector are arranged preferably in a predetermined relation capable of detecting a Talbot image.

The ninth phase of the present invention relates to the optical encoder according to the seventh phase, wherein the optical encoder is configured preferably to satisfy approximately the relation of $1/z1+1/z2=\lambda/(n(p1)^2)$, where $\lambda$ is a wavelength of the light beam emitted from the light beam exit opening; and n is a natural number.

The tenth phase of the present invention relates to the optical encoder according to the seventh phase, wherein the optical element transmitting the predetermined portion of the light beam is preferably a slit having a light transmitting portion and a light shielding portion, and the width W of the light beam exit opening in the scale moving direction is the width Ws of the slit in the scale moving direction.

The eleventh phase of the present invention relates to the optical encoder according to the tenth phase, wherein the slit has preferably a plurality of openings in the scale moving direction, and the plurality of openings are disposed at positions of about integer times of the pitch p2 of the light detector.

The twelfth phase of the present invention relates to optical encoder according to the seventh phase, wherein the optical element transmitting the predetermined portion of the light beam is preferably a slit having a circular opening, and the width W of the light beam exit opening in the scale moving direction is a diameter Ws of the circular opening.

The thirteenth phase of the present invention relates to the optical encoder according to the twelfth phase, wherein the circular opening is plural, and the plurality of circular openings are disposed preferably at a position of about integer times of the pitch p2 of the light detector in the scale moving direction.

The fourteenth phase of the present invention relates to the optical encoder according to the thirteenth phase, wherein the circular opening is plural, and the plurality of circular openings are disposed preferably in a plane parallel to a pattern surface of the scale, in a direction orthogonal to the scale moving direction.

The fifteenth phase of the present invention relates to the optical encoder according to the tenth phase, wherein the light source unit further has preferably a lens which sets a beam divergent angle of the light beam to a predetermined value.

The sixteenth phase of the present invention relates to the optical encoder according to the tenth phase, wherein the optical element transmitting the predetermined portion of the light beam is disposed preferably such that the light beam emitted from the light source unit is reflected by the scale, and then does not shield an optical path from the scale toward a region of the light detector having an effective reception sensitivity.

The seventeenth phase of the present invention relates to the optical encoder according to the tenth phase, further comprising preferably a plurality of photo detectors which detect a predetermined phase portion of a light intensity pattern on a receiving surface of the light detector formed when the light beam emitted from the light source unit and passing through the scale impinges upon the receiving surface.

The eighteenth phase of the present invention relates to the optical encoder according to the tenth phase, the photo detectors of the light detector is configured preferably to be capable of detecting a predetermined phase portion of a light intensity pattern having a pitch of about $p1\times(z1+z2)/z1$.

The nineteenth phase of the present invention relates to the optical encoder according to the first phase, wherein the width W of the light beam exit opening in the scale moving direction is preferably $p1\times(z1+z2)/(2\times z2)$ or less.

The twentieth phase of the present invention relates to the optical encoder according to the nineteenth phase, wherein one or more light beam exit openings are disposed preferably in the scale moving direction at positions of $(z1+z2)/$ z2×m (where m is an integer of 1 or more) times of the pitch p1 of the periodic optical pattern of the scale.

The twenty first phase of the present invention relates to the optical encoder according to the twentieth phase, wherein the light beam exit opening of the light source unit is preferably a light beam exit window formed on a light beam emission surface of the light source, and the width W of the light beam exit opening in the scale moving direction is the width WLs of the light beam exit window in the scale moving direction.

The twenty second phase of the present invention relates to the optical encoder according to the twentieth phase, wherein the light beam exit opening of the light source unit is preferably an optical element disposed on an optical path of a light beam from the light source toward the scale and passing through a predetermined portion of the light beam.

The twenty third phase of the present invention relates to the optical encoder according to the twenty second phase, wherein the light beam exit opening of the light source unit, the scale, and the light detector are arranged preferably in a predetermined relation capable of detecting a Talbot image.

The twenty fourth phase of the present invention relates to the optical encoder according to the twenty second phase, wherein the optical encoder is configured preferably to satisfy approximately the relation of $1/z1+1/z2=\lambda/(n(p1)^2)$, where $\lambda$ is a wavelength of the light beam emitted from the light beam exit opening and n is a natural number.

The twenty fifth phase of the present invention relates to the optical encoder according to the twenty second phase, wherein the optical element transmitting the predetermined portion of the light beam is preferably a slit having a light transmitting portion and a light shielding portion, and the width W of the light beam exit opening in the scale moving direction is the width Ws of the slit in the scale moving direction.

The twenty sixth phase of the present invention relates to a method of adjusting an output signal level depending on a period p2 of a light intensity pattern formed on a receiving surface of a light detector, in an optical encoder comprising: a light source unit; an optical element of the light source unit, which causes a predetermined portion of a light beam emitted from a light source to pass therethrough; a scale which has a periodic optical pattern and displaces relatively to the light source unit; and a light detector to detect a light beam emitted from the light source unit and traveled by way of the scale, the method comprising:

(i) a step of detecting a light intensity pattern formed on the receiving surface of the light detector;

(ii) a step of checking a level of the output signal depending on the period p2 of the light intensity pattern detected by the light detector;

(iii) a step of determining whether or not the level of the output signal is included in a predetermined range; and (iv) a step of, when the level of the output signal is not included in the predetermined range of the signal level, changing a distance from the optical element to the scale, wherein the steps from (i) to (iv) are repeated to adjust the output signal level.

The twenty seventh phase of the present invention relates to an optical encoder comprising:

a light source unit;

a scale which has a periodic optical pattern and dislocates relatively to the light source unit; and a light detector to detect a light beam emitted from the light source unit and traveled by way of the scale, wherein the light source unit has an optical unit which sets a beam divergent angle of the light beam to a predetermined value.

The twenty eighth phase of the present invention relates to the optical encoder according to the twenty seventh phase, wherein the light source unit, the scale, and the light detector are arranged preferably in a predetermined relation capable of detecting a Talbot image.

The twenty ninth phase of the present invention relates to the optical encoder according to the twenty seventh phase, wherein the optical encoder is configured preferably to satisfy approximately the relation of $1/z1+1/z2=\lambda/(n(p1)^2)$, where z1 is a distance between the light source unit and the scale, z2 is a distance between the scale and the light detector, p1 is a pitch of the periodic optical pattern of the scale, $\lambda$ is a wavelength of the light beam emitted from the light source unit, and n is an integer.

The thirtieth phase of the present invention relates to the optical encoder according to the twenty seventh phase, wherein the optical element which sets a beam divergent angle of the light beam to a predetermined value is preferably a lens.

The thirty first phase of the present invention relates to the optical encoder according to the thirtieth phase, wherein the lens is preferably a concave lens.

The thirty second phase of the present invention relates to the optical encoder according to the thirtieth phase, wherein the lens is preferably an optical system composed of a lens group.

The thirty third phase of the present invention relates to the optical encoder according to the thirtieth phase, wherein the lens is preferably a cylindrical lens having a focusing action only in the scale moving direction.

The thirty fourth phase of the present invention relates to the optical encoder according to the thirtieth phase, wherein the lens has preferably a function of expanding the beam divergent angle of the light beam lens in the scale moving direction, and has a function of focusing the beam divergent angle of the light beam in a plane orthogonal to the scale moving direction and parallel to the scale pattern,.

The thirty fifth phase of the present invention relates to the optical encoder according to the thirtieth phase, wherein the optical element which sets a beam divergent angle of the light beam to a predetermined value is disposed preferably such that the light beam emitted from the light source unit is reflected by the scale, and then does not shield an optical path from the scale toward a region of the light detector having an effective optical sensitivity.

The thirty sixth phase of the present invention relates to the optical encoder according to the thirtieth phase, preferably further comprising a plurality of photo detectors which detect a predetermined phase portion of the light intensity pattern on a receiving surface of the light detector formed when the light beam emitted from the light source unit and traveled by way of the scale impinges upon the receiving surface.

The thirty seventh phase of the present invention relates to the optical encoder according to the thirtieth phase, the photo detector of the light detector is configured preferably to be capable of detecting a predetermined phase portion of a light intensity pattern formed on the receiving surface of the light detector of which period p2 is about $(z2+z3)/z3 \times p1$, where z2 is a distance between the scale and the light detector, p1 is a pitch of the periodic optical pattern of the scale, and z3 is a distance from a position of a virtual spot light source to the scale, the position being calculated from the divergent angle of the light beam having passed through the optical element which sets a beam divergent angle of the light beam to a predetermined value.

The thirty eighth phase of the present invention relates to the optical encoder according to a method of adjusting a level of an output signal depending on a period p2 of a light intensity pattern formed on a receiving surface of a light detector, in an optical encoder comprising: a light source unit; a scale which has a periodic optical pattern and displaces relatively to the light source unit; and a light detector to detect a light beam emitted from the light source unit and traveled by way of the scale, the method comprising:

(i) a step of setting a beam divergent angle of a light beam emitted from a light source of the light source unit to a predetermined value;

(ii) a step of calculating a position of a virtual spot light source from the set beam divergent angle;

(iii) a step of detecting a light intensity pattern formed on the surface of the light detector;

(iv) a step of checking the level of the output signal depending on the period p2 of the light intensity pattern detected by the light detector;

(v) a step of determining whether or not the level of the output signal is included in a predetermined range; and (vi) a step of terminating the adjustment when the level of the output signal is included in the predetermined range of the output signal, and changing the distance from the calculated position of the virtual spot light source to the scale when the level of the output signal is not included in the predetermined range of the signal level, wherein the steps from (iii) to (vi) are repeated to adjust the output signal level.

The thirty ninth phase of the present invention relates to an optical encoder comprising:

a light source unit;

a scale which has a periodic optical pattern and dislocates relatively to the light source unit; and a light detector to detect a light beam emitted from a light source of the light source unit and traveled by way of the scale;

wherein the light source unit has a light beam exit opening through which a light beam is emitted toward the scale, and the width W of the light beam exit opening in the scale moving direction is determined depending on the value of $p1 \times (z1+z2)/z2$, where $z1$ is a distance between the light beam exit opening and the scale, $z2$ is a distance between the scale and the light detector, and $p1$ is a pitch of the periodic optical pattern of the scale.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
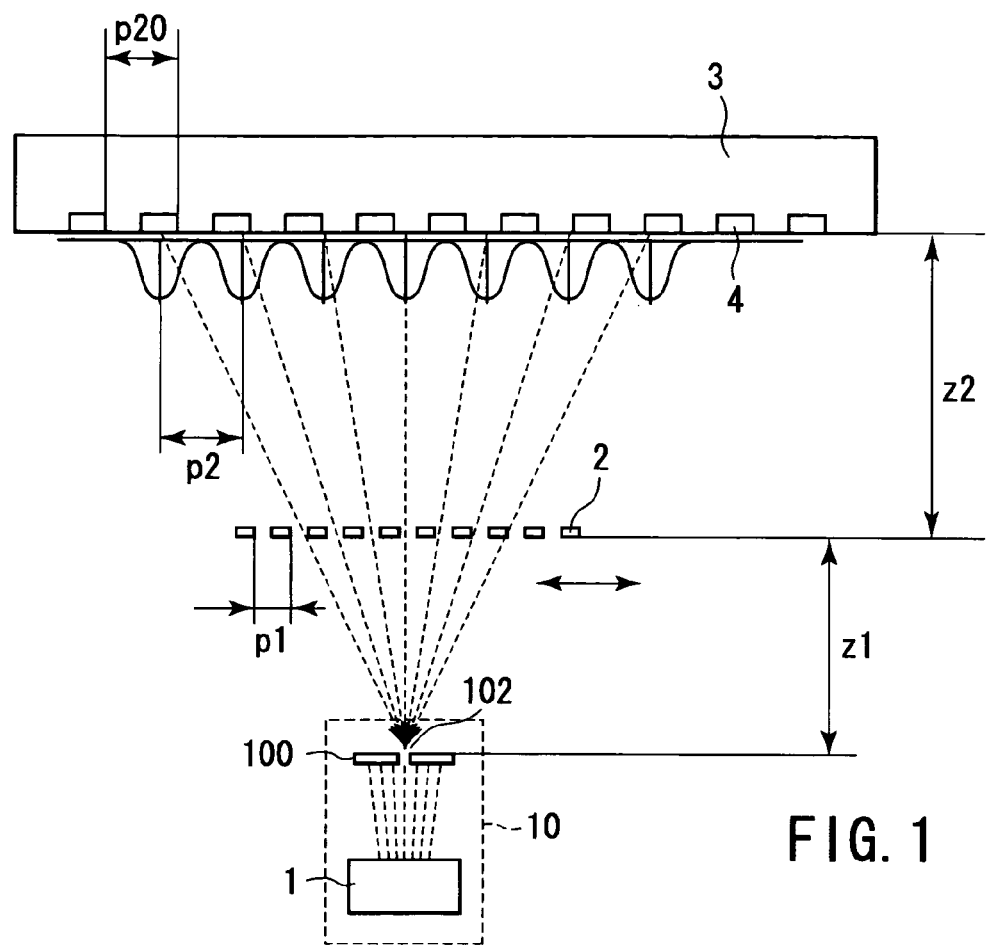
FIG. 1 is a diagram showing a configuration of an optical encoder according to a first embodiment of the invention.

An outline of an optical encoder of the invention is explained in the first place. A sensor head of the optical encoder of the invention uses a coherent light source having a light beam exit window width satisfying the condition calculated from a pitch of a scale, a distance between a light source and the scale, and a distance between the scale and a light detector, and is therefore designed to obtain a sufficient contrast of a light intensity pattern projected on the light detector. The coherent light source having a light beam exit window width smaller than the scale pitch is not always required.

The sensor head of the optical encoder of the invention has an optical element for transmitting a predetermined portion of the light beam emitted from the light source, disposed between the light source and the scale. Therefore, a light intensity pattern of large contrast is formed even in the case of using the scale of a small scale pitch for the width of the light source, and by detecting it, the scale of a smaller scale pitch is realized as compared with the light beam exit window width of the light source.

Further, the optical encoder of the invention has an optical element for transmitting a predetermined portion of the light beam emitted from the light source, disposed between the light source and the scale, or has an optical element for setting a beam divergent angle of the light beam emitted from the light source at a predetermined value, and thereby the magnification factor of the Talbot image can be adjusted. Therefore, it is not required to reduce the width of a photo diode for composing the photo detector, so that the scale of a smaller scale pitch can be used. In addition, even if the same scale is used, since the Talbot image is magnified, the resolution can be further enhanced.

Referring now to the drawings, the optical encoder of the invention is more specifically described below.

First Embodiment

FIG. 1 is a diagram showing a configuration of an optical encoder according to a first embodiment of the invention, which comprises a light source 1, a scale 2 having a periodic optical pattern relatively and displacing to the light source 1, and a light detector 3 for detecting the light beam emitted from the light source 1 and passing through the scale 2. Slits 100 are provided between the light source 1 and the scale 2, and the light source 1 and the slits 100 compose a light source unit 10.

The light source 1 is an LED which emits a light beam of wavelength $\lambda$, and the scale 2 is a transmission type scale having a scale pitch p1. The slits 100 are slits having a slit opening 102 in a substantially same size as the scale pitch p1.

The light beam emitted from the light source 1 is directed toward the slits 100, and only the light beam having passed through the slit opening 102 is emitted toward the scale 2. At this time, the light beam having passed through the slit opening 102 is emitted toward the scale 2 as a spherical wave on a virtual spotlight source of the slit opening 102, and enters the light detector 3 by way of the scale 2.

Figure 2:
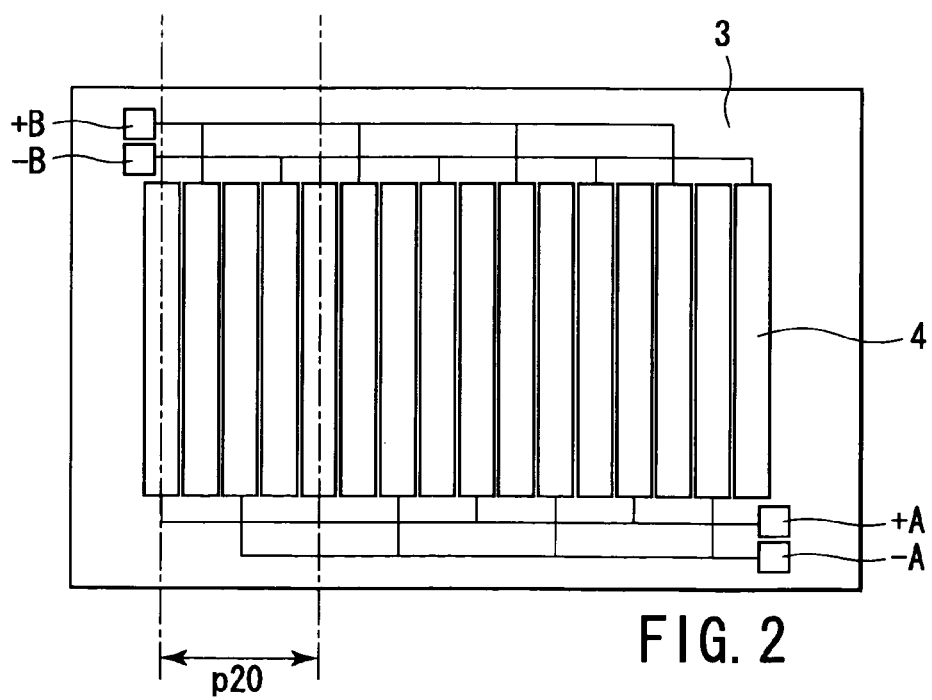
FIG. 2 is a diagram showing a configuration of a light detector 3 according to the first embodiment.
Figure 25:
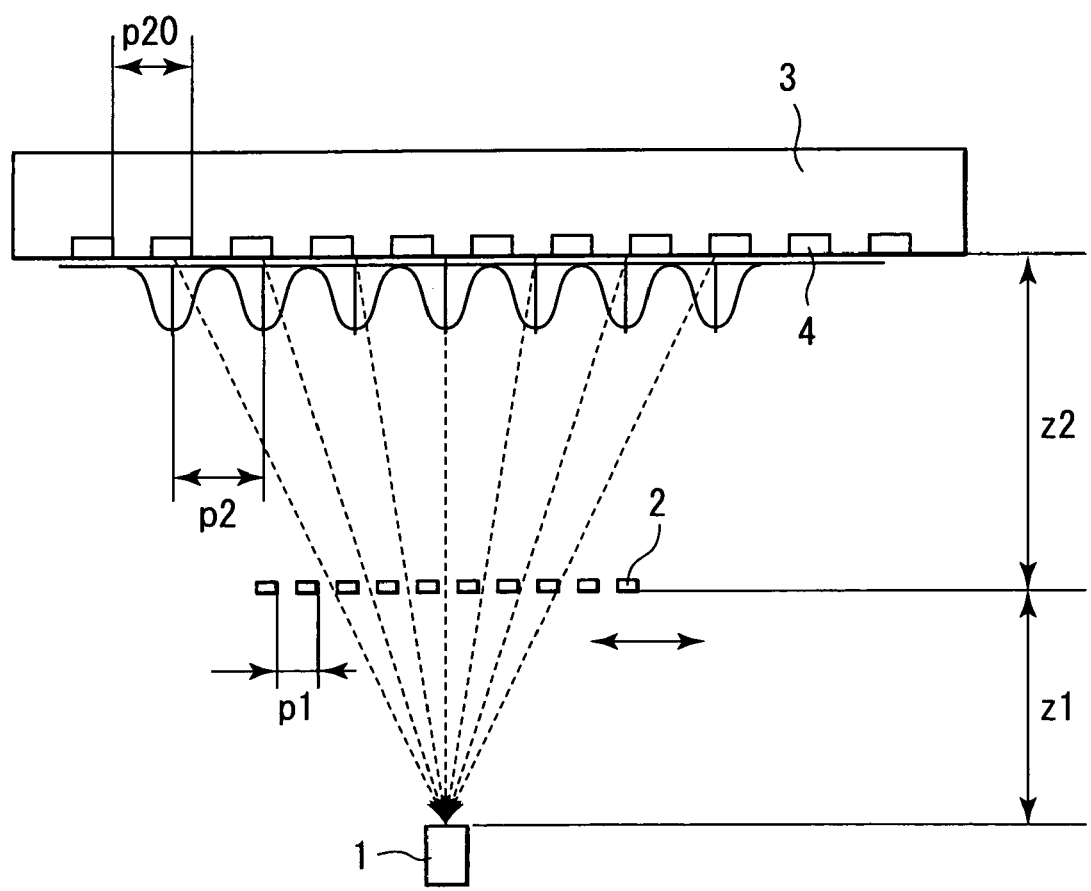
FIG. 25 is a diagram explaining a Talbot image.

FIG. 2 is a diagram showing a configuration of the light detector 3 of the embodiment, which is composed of a photo detector array in which a plurality of photo detector 4 are arranged one-dimensionally. The photo detector array is divided into four groups, +A, +B, −A, and −B each connected electrically in every period of p20, so as to detect four phase portions different in phase by 90 degrees each of the light and dark pattern having period of p2. Signals to be detected by the four groups are four signals differing in phase by 90 degrees each, and, for example, (+A) and (−A) are inverted signals different in phase by 180 degrees. The phase A signal and phase B signal in FIG. 25 are outputted as phase A signal=(+A)−(−A), and phase B signal=(+B)−(−B).

It is known that a Talbot image is formed on the light detector 3 when the light source 1, scale 2, and light detector 3 are in the positional relation as defined in the above formula (1). In this embodiment, since the slit opening 102 of the slits 100 can be regarded as a virtual light source position, as far as the slit opening 102, scale 2, and light detector 3 are disposed in the relation in the formula (1), a Talbot image is formed on the light detector 3. In this case, the formula (1) may be expressed as follow:

$$(1/z1)+(1/z2)=\lambda / (k(p1)^2) \quad (1')$$

where z1 is a distance between the slit opening 102 and the surface on the scale 2 having the diffraction grating formed thereon;

z2 is a distance between a surface on the scale 2 having diffraction grating formed thereon and the light detector 3;

p1 is a pitch of the diffraction grating on the scale 2;

$\lambda$ is a wavelength of a light beam emitted from the light source 1; and k is a natural number.

A pitch p2' of a diffraction interference pattern of the Talbot image projected on the light detector 3 in the embodiment is similarly calculated as follows on the basis of the above formula (2):

$$P2'=p1(z1+z2) / z1 \quad (2')$$

where p2' is a pitch of a diffraction interference pattern on the receiving surface of the light detector 3; and p20 is a pitch of a photo detector array formed on the light detector 3, that can detect the diffraction interference pattern.

Therefore, by setting the relation of p20 and p2' as shown in the following formula (3), the light detector 3 can detect the motion of the Talbot image.

$$P20=p2'=p1(z1+z2) / z1 \quad (3)$$

In this configuration, even in the case of using the light source having a large light beam exit window as compared with the scale pitch, a Talbot image having a sufficient contrast can be projected on the light detector, and further by adjusting the position of the slits 100, the magnification factor of the Talbot image can be adjusted without changing the position of the light source 1 and light detector 3. Therefore, without increasing the cost practically, the scale 2 of small pitch can be used, and even if the pitch of the photo detectors is the same, an optical encoder of higher resolution can be composed.

Figure 3:
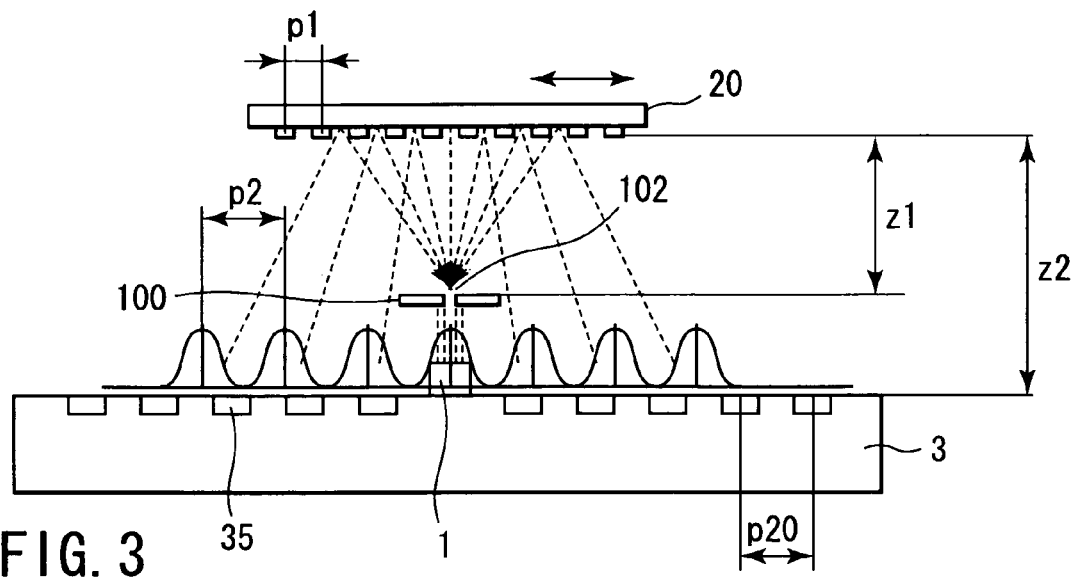
FIG. 3 is a diagram showing a configuration of a reflection type optical encoder as a modified example of the first embodiment.

In the embodiment, the transmission type optical encoder is explained. However, as shown in FIG. 3, substantially the same configuration can be applied in a reflection type optical encoder in which the light beam emitted from the light source 1 is reflected by the scale 20, and the reflected beam is detected by the light detector 3 disposed at the same side as the light source 1. Reference numeral 35 is a photo detector of the light detector 3.

Thus, in the reflection type optical encoder, the light beam reflected by the scale 20 enters a portion having an effective optical sensitivity of the photo detector 35 formed on the light detector 3, and it is preferred that the slits 100 does not shield a path of the light beam which travels from this scale 20 toward the photo detector 35 formed on the light detector 3.

Second Embodiment

Figure 4:
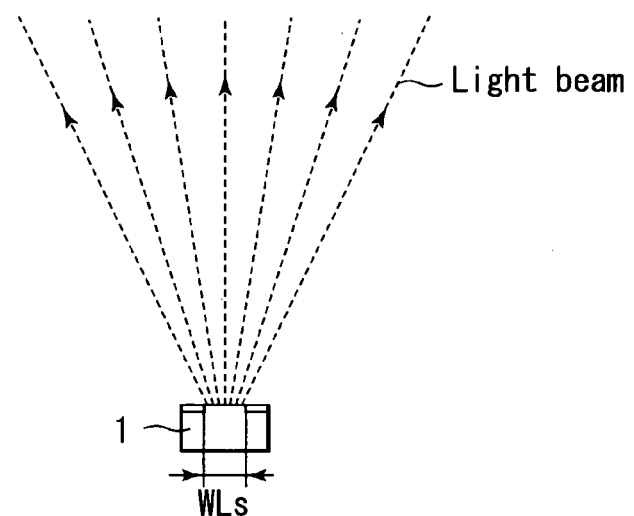
FIG. 4 is a diagram showing a current confinement type LED having a light beam exit window width WLs for use in a second embodiment of the invention.
Figure 5:
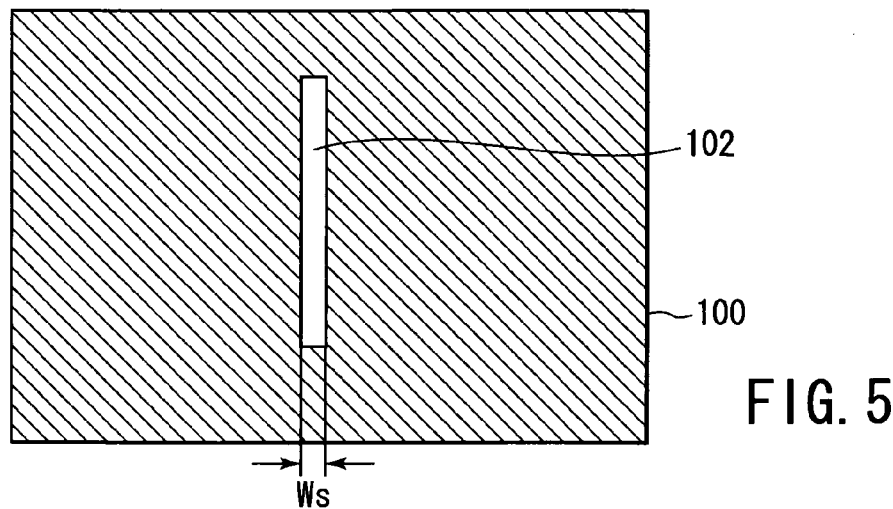
FIG. 5 is a diagram showing the opening width Ws in the second embodiment.

An optical encoder according to a second embodiment of the invention is explained. The configuration and operation of the second embodiment are basically same as in the first embodiment described by reference to FIG. 1, and the detailed description of the configuration is omitted herein. The second embodiment is different from the first embodiment in that the light source 1 is a current confinement type LED having a light beam exit window width WLs as shown in FIG. 4, and the opening width in the moving direction of the scale 2 of the slit opening 102 is an effective opening width Ws (see FIG. 5) as described below.

As compared with the ordinary LED which emits light from the entire surface of the LED, since the current confinement type LED emits light only in a specified area, the light intensity per unit solid angle is large. Therefore, when it is desired to illuminate the scale by the light beam of the same optical intensity, a smaller power is realized, so that the optical encoder can be operated more efficiently.

In this embodiment, the slits 100, scale 2, and light detector 3 are disposed such that z1 and z2 are equal to each other in formula (1'). Therefore, from formula (2'), p2'=p20=2×p1 is obtained.

The light beam exit window width WLs of the light source 1 is larger than the scale pitch p1 of the scale 2, whereas the opening width Ws of the slit opening 102 is odd-number times of the scale pitch p1.

Figure 6:
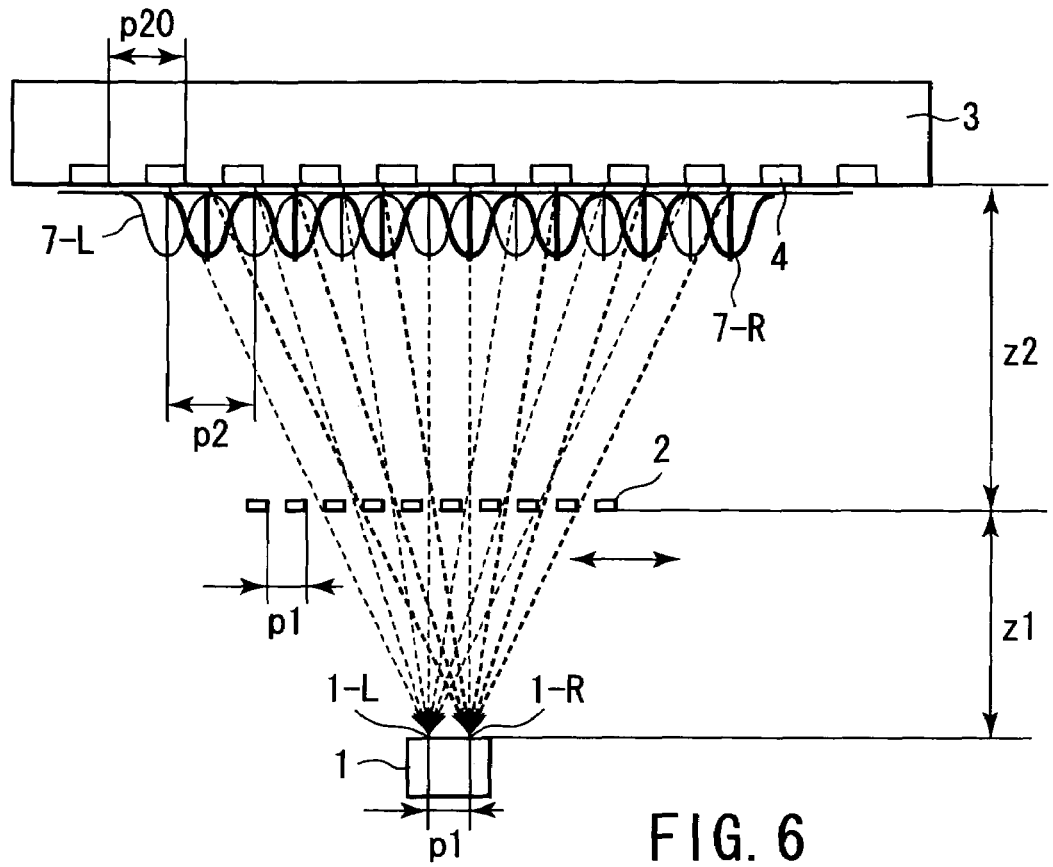
FIG. 6 is a diagram explaining a Talbot image without slits 100, using a coherent light source 1 having a light beam exit window width WLs larger than a slit pitch p1.

Using the light source 1 of which light beam exit window width WLs is larger than the slit pitch p1, the Talbot image without using the slits 100 is explained by referring to FIG. 6.

When the light source 1 has the light beam exit window width WLs, it may be supposed that a plurality of spot light beams are positioned on the exit window. FIG. 6 shows a Talbot image by two spot light sources 1-L and 1-R spaced from each other by distance p1 on the exit window of the light source 1. As shown in FIG. 6, the light portion of a Talbot image 7-R by the spot light source 1-R and the dark portion of a Talbot image 7-L by the spot light source 1-L are overlapped, and the dark portion of the Talbot image 7-R by the spot light source 1-R and the light portion of the Talbot image 7-L by the spot light source 1-L are overlapped. As a result, the Talbot images by the both spot light sources 1-L and 1-R cancel each other.

More specifically, when the distance between two virtual spot light sources on the exit window of the light source 1 is equal to the scale pitch p1, they cancel each other, and do not contribute to formation of the Talbot image. Theoretically, when the interval of virtual spot light sources is even-number times of the period p1 of the light beam, since the spot of interval of p1 can be found in all spots on the light beam exit window of the light source, the Talbot image is completely deleted. To the contrary, in the case of odd-number times of p1, portions which do not cancel Talbot images each other are left over.

In the configuration of the second embodiment of the invention, suppose the slits 100 having the opening width Ws of odd-number times of the scale pitch p1 are inserted as shown in FIG. 1. In this case, of the light beams emitted from the light source 1, only the light beam having passed through the slit opening 102 of the slits 100 is directed toward the scale 2. At this time, the slit opening 102 may be regarded as a virtual light source. This slit opening 102 has the width of odd-number times of the scale pitch p1. Thus, the plurality of virtual spot light sources for composing the slit opening 102 as the light source has a set of spot light sources not finding the mutually canceling spot light sources by the portion of the width p1, even if the spot light sources of mutually canceling Talbot images are deleted. Therefore, a Talbot image of a sufficient contrast can be formed.

Incidentally, the light beams which do not contribute to formation of the Talbot image by canceling each other enter the light detector 3 as background light, which adds to the background of the detection signal, and it causes to lower the relative contrast of the Talbot image detected by the light detector 3. When the light beam exit window width WLs is sufficiently large as compared with the scale pitch p1, since the background becomes high as mentioned above, the contrast of the diffraction interference pattern of the Talbot image detected by the light detector 3 to be smaller, and it is not a preferred configuration. Practically, by setting the opening width Ws of the slit opening 102 at several times of the scale pitch p1, a diffraction interference pattern of the Talbot image of large contrast can be formed.

On the other hand, when the light beam emitted from the light source 1 is small in the intensity in the peripheral area as compared with that on the optical axis as in the case of the light source having a beam profile conforming to, for example, Gaussian distribution, the light beams passing through the slits 100 are not always uniform, but distribute in light intensity. Accordingly, when the opening width Ws of the slit opening 102 is slightly larger than two times the scale pitch p1, the contrast of the Talbot image is the minimum.

Figure 7:
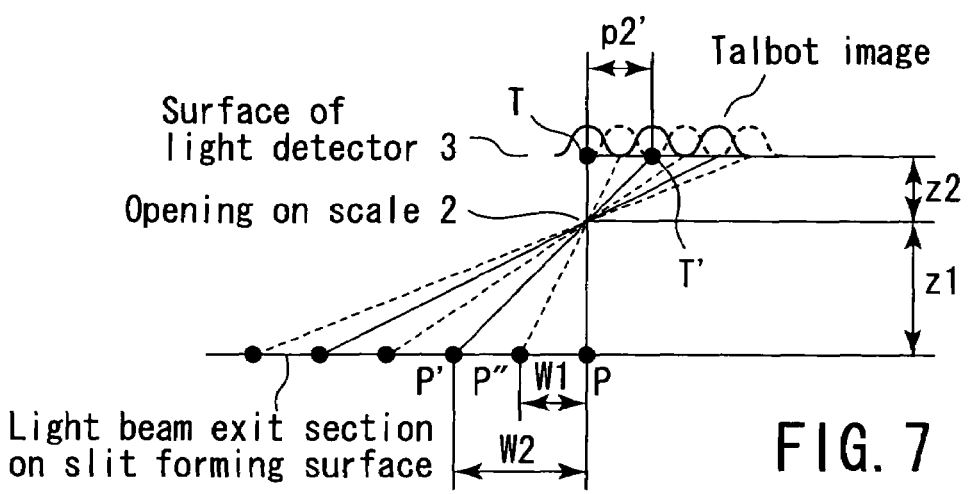
FIG. 7 is a diagram for general explanation of a Talbot image.

In this embodiment, z1 and z2 are equal in the formula (1'), that is, the pitch p2' of the Talbot image is two times the scale pitch p1, and a more general explanation is given in FIG. 7.

The light beams emitted from the virtual spot light sources on the light beam exit window of the light source 1 illuminate the scale 2, and a Talbot image is formed on the receiving surface of the light detector 3. FIG. 7 shows the position of the light and dark pattern of the Talbot image formed on the receiving surface of the light detector 3 when the scale 2 is fixed on the light source 1. The light beam emitted from a certain spot passes through an opening on the scale 2, and reaches the receiving surface of the light detector 3. At this time, when the wavelength of the light source 1, the distance z1 between the slits 100 and the scale 2, the distance z2 between the scale 2 and the light detector 3, and the pitch p1 of the scale 2 satisfy the relation of the formula (1'), a Talbot image is formed on the receiving surface of the light detector 3.

An emitting light beam from a certain point P on the slit opening 102 passes through a certain opening on the scale 2, and forms a peak of a Talbot image on a point T on the receiving surface of the light detector 3. The pitch p2' of the Talbot image by this spot light source P is the pitch calculated by the formula (2'), and a light and dark pattern is formed periodically on the receiving surface of the light detector 3 as shown in the diagram. Next, suppose an emitting light beam from a light source P' apart from this light source P by distance W2 passes through the same opening on the scale 2, and reaches a position T' of the peak next to the Talbot image formed by the light source P of the Talbot image formed on the light detector 3. The Talbot images formed by the light source P and light source P' completely overlap each other, and emphasize each other. At this time, the relation is as shown in formula (4).

$$W2 = P2' \times z1/z2 = p1 \times (z1+z2)/z2 \qquad (4)$$

Suppose a position of the light source 1 for forming a peak of the Talbot image somewhere between the point T and the point T'. As clear from FIG. 7, such position P'' of the light source 1 is an intermediate position between point P and point P'. That is, W1 in the diagram is given in the following formula.

$$W1 = W2/2 \quad (5)$$
$$= P2' \times z1/(2 \times z2)$$
$$= p1 \times (z1+z2)/(2 \times z2)$$

That is, in a more general case of the embodiment, the opening width Ws of the slit opening 102 may be defined in the following range.

$$p1 \times (z1+z2)/(2 \times z2) \times (2n-1.5) \leq Ws \leq p1 \times (z1+z2)/(2 \times z2) \times (2n-0.5) \quad (6)$$

where n is a natural number.

If Ws is out of the range of the formula (6), the signal level deteriorates, but does not deteriorate immediately to an impractical level. Therefore, preferably, Ws is in the range of the formula (6), but its function is not lost immediately even if slightly going out of the range. Hence, it is sufficient that Ws is approximately included in this range.

As in this embodiment, if the case of z2=z1, the formula (6) is rewritten as follows:

$$p1 \times (2n-1.5) \leq Ws \leq p1 \times (2n-0.5) \quad (6')$$

In such configuration, a Talbot image of a larger contrast can be formed, and the output signal from the light detector 3 may be also a signal of high intensity.

In this embodiment, the slit opening 102 is shown as an example of square slits 100, but it may be also formed as circular, elliptical, quadrangular, polygonal and the like as far as not departing from the true spirit and the scope of the invention.

Third Embodiment

An optical encoder according to a third embodiment of the invention is explained. The configuration and operation of the third embodiment are basically same as in the first embodiment described by reference to FIG. 1, and the detailed description of the configuration is omitted herein. The third embodiment is different from the first embodiment in that the light source 1 is a current confinement type LED having a light beam exit window width WLs as shown in FIG. 4, and the slit opening 102 of the slits 100 is composed of a plurality of slit openings (see FIG. 8) arranged at slit pitch ps.

In this embodiment, the slit pitch ps of the slit openings 102 is about integer times of the scale pitch p1, and is set at about integer times of the pitch p2 of the Talbot images.

Figure 9:
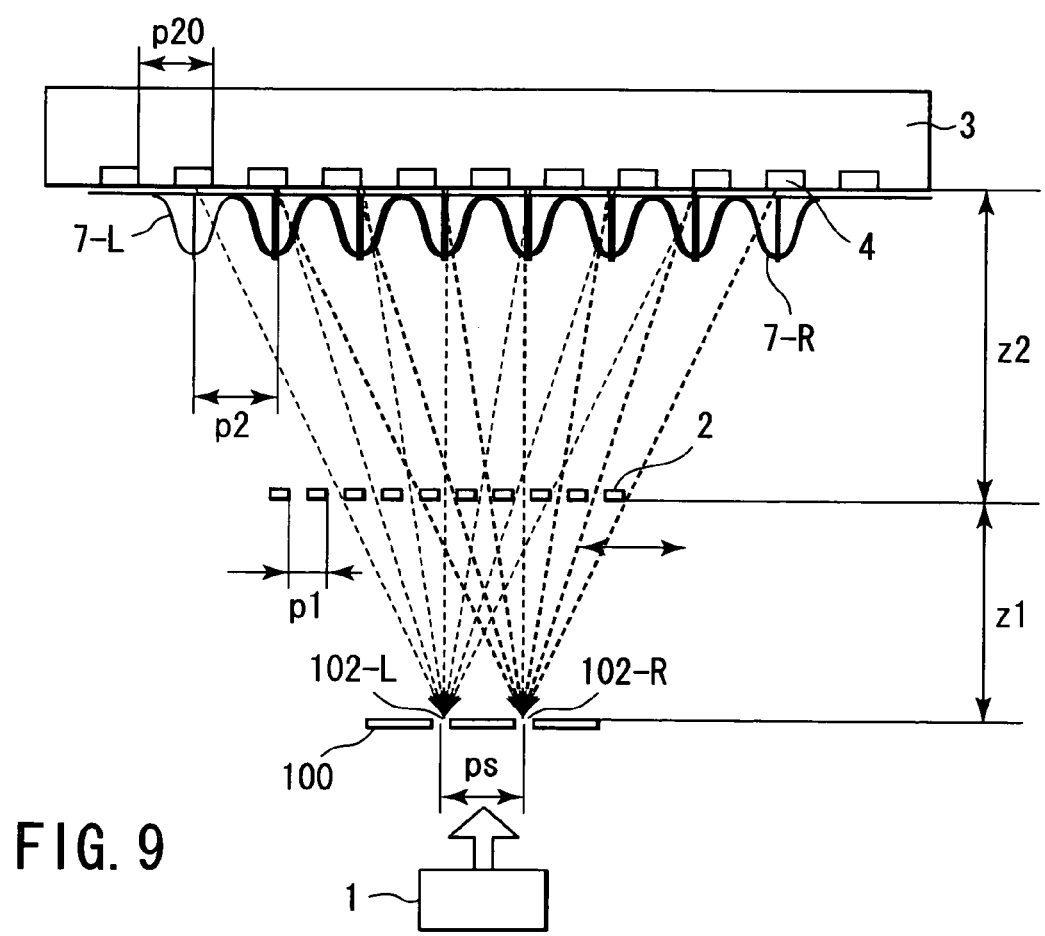
FIG. 9 is a diagram showing overlapping of Talbot images formed by light beams emitted from two slits apart at distance ps.

FIG. 9 shows an overlapping image of Talbot images formed by light beams emitted from two slits apart from each other by slit pitch ps. As shown in FIG. 9, by setting the slit pitch ps about integer times of the scale pitch p1 and about integer times of the pitch p2 of the Talbot images, the diffraction interference patterns of a Talbot image 7-R formed by a light beam having passed through a slit opening 102-R, and a Talbot image 7-L formed by a light beam having passed through the slit opening 102-L overlap each other, and a Talbot image of a higher light intensity can be formed on the light detector 3.

Incidentally, when z1 and z2 are nearly equal to each other, it is known from the formulas (1') and (2') that the slit pitch ps be about integer times of the pitch p2 of the Talbot images, that is, about even-number times of p1.

More generally, it is sufficient that the slits 100 are disposed at positions of integer times of W2 shown in the formula (4), that is, the openings 102 of the slits 100 are disposed at positions of n×(z1+z2)/z2 times of the pitch p1 of the scale 2 where n is a natural number.

Figure 8:
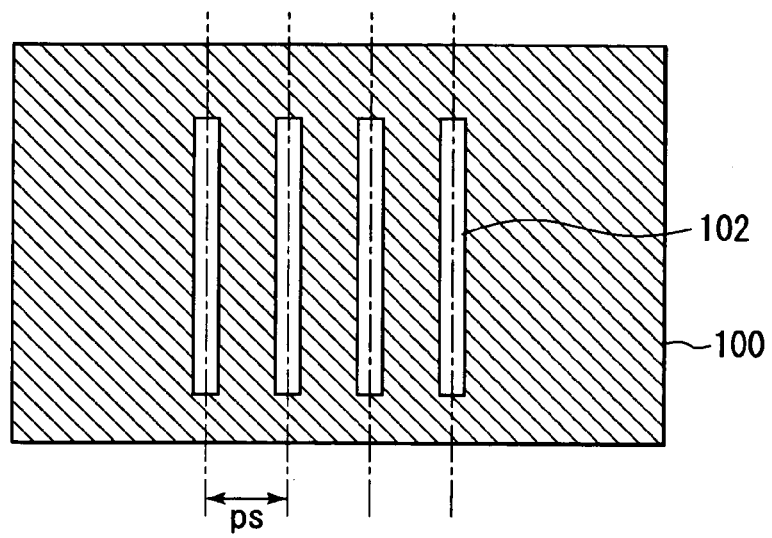
FIG. 8 is a diagram showing a configuration in which plural rows of slit openings 102 arranged at pitch ps according to a third embodiment of the invention.
Figure 10A:
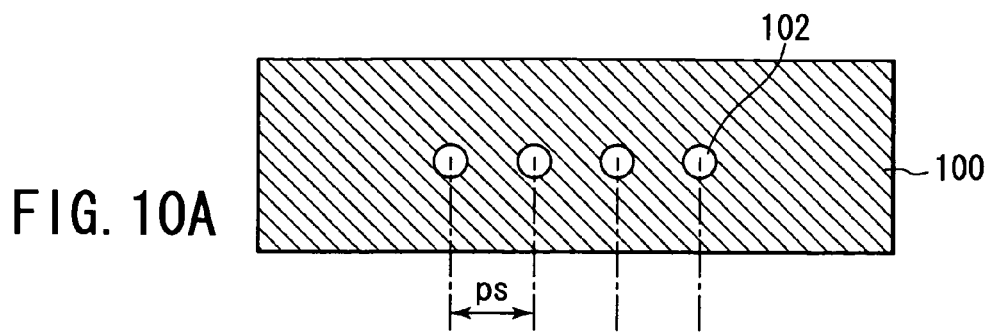
FIGS. 10A and 10B are diagrams showing an example of the shape of the slit openings 102.
Figure 10B:
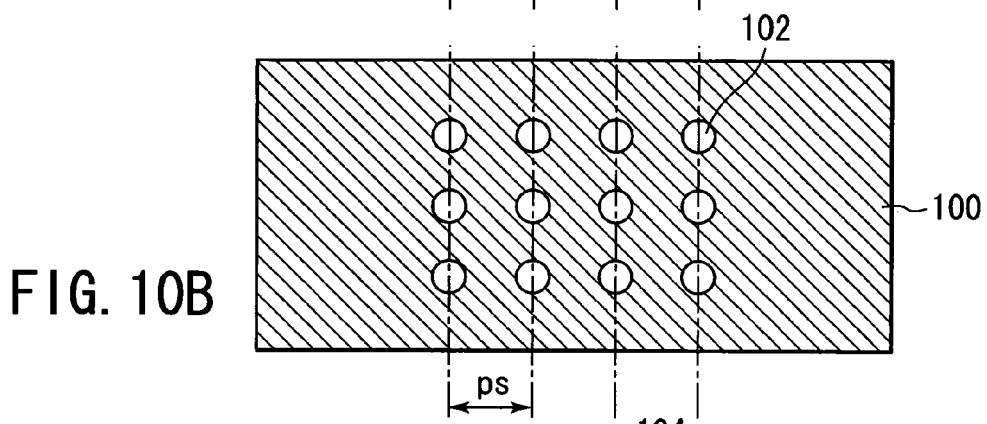
Figure 11A:
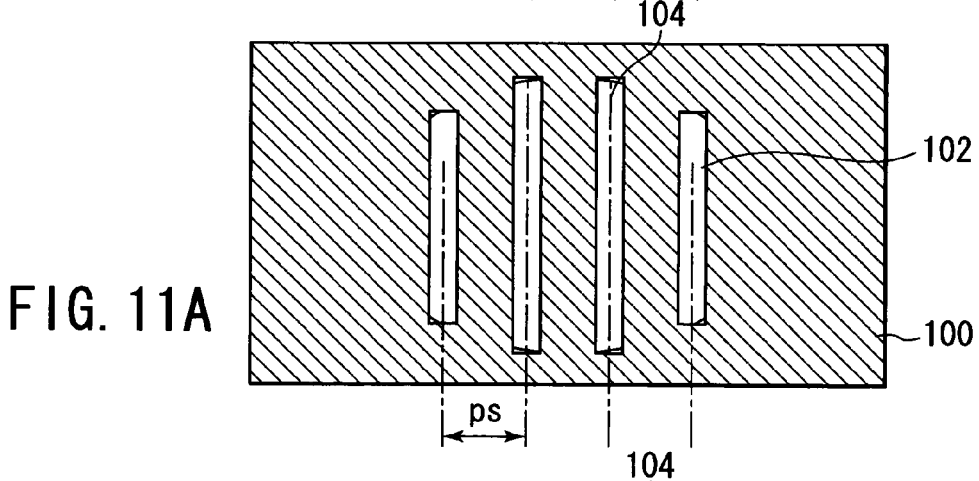
FIGS. 11A and 11B are diagrams showing another example of the shape of the slit openings 102.
Figure 11B:
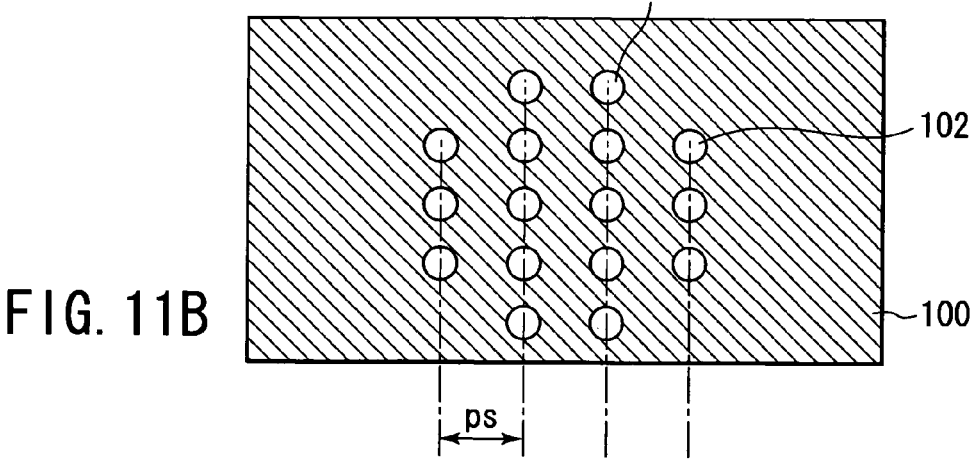

In FIG. 8, four slit openings 102 are provided, but the number is not particularly specified as far as it is two or more, and the shape of the slit openings 102 may be modified freely as shown in FIGS. 10A and 10B, including a circular shape of the slit opening 102 (FIG. 10A), square, polygonal, elliptical or other shapes. Other modifications include two-dimensional layout as shown in FIG. 10B, layout according to the shape of the beam spots 104 on the slits 100 by the light beam emitted from the light source 1 (FIGS. 11A and 11B), and the like.

The slits 100 include a type having through-holes formed in a shielding member made of a metal or the like, a type in which a metal film formed on a glass plate is patterned by etching or other technique, or any other type using a member allowing to transmit a predetermined portion of light beam.

In the configuration of the embodiment, by effectively making use of the light beams emitted from the light source 1 without increasing the intensity of the light beams emitted from the light source 1, the light intensity of the Talbot image entering the light detector 3 can be enhanced.

Fourth Embodiment

Figure 12:
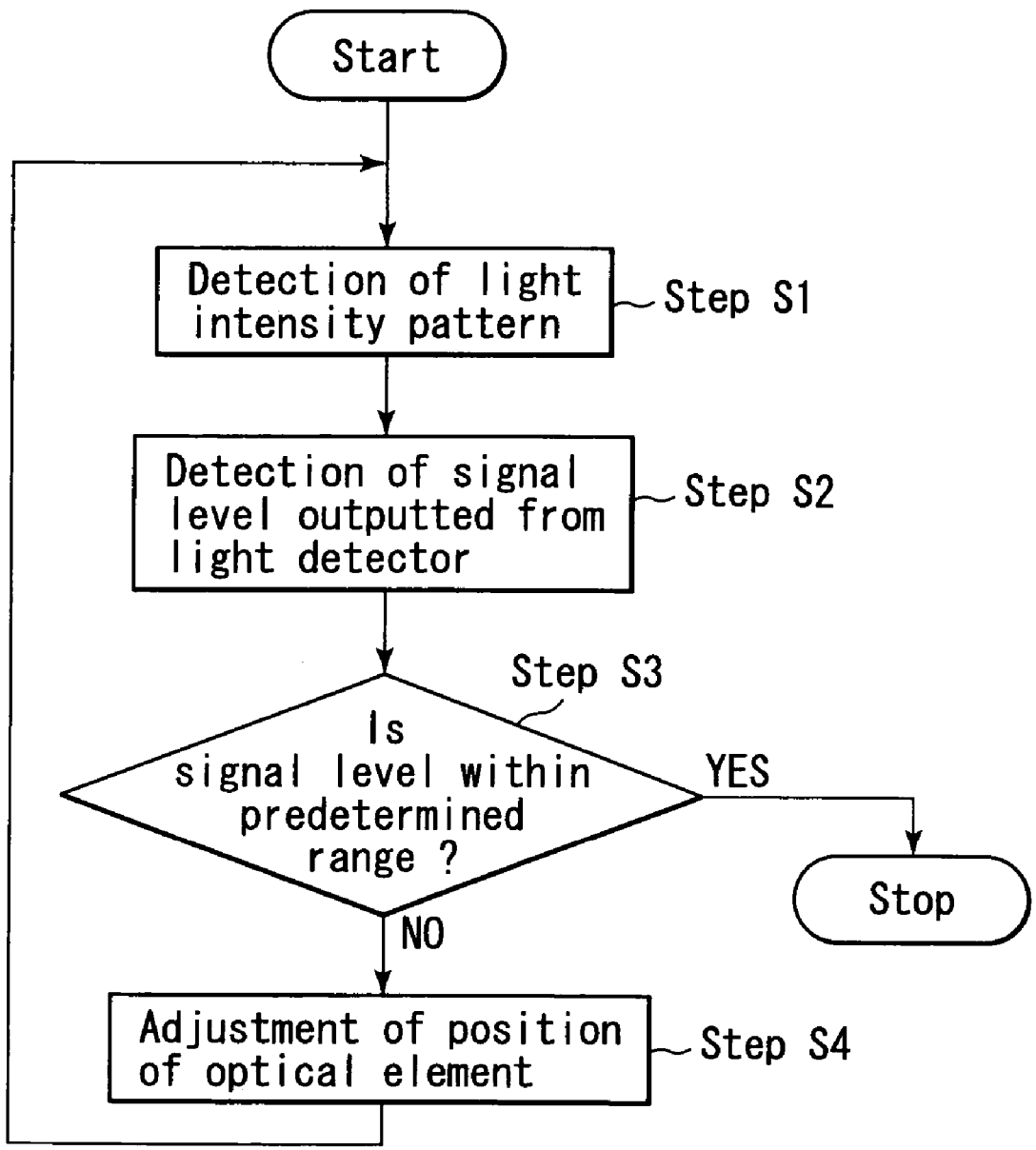
FIG. 12 is a diagram explaining a method of adjusting a level of an output signal of a light detector depending on a period p2 of a light intensity pattern formed on a receiving surface of a light detector.

A fourth embodiment of the invention is explained. The fourth embodiment of the invention relates to a method of adjusting a level of an output signal of a light detector depending on a period p2 of a light intensity pattern formed on a receiving surface of the light detector. FIG. 12 is a flowchart explaining the detail of such an adjusting method. First, a light intensity pattern formed on the receiving surface of the light detector is detected (step S1). Next is detected a level of an output signal corresponding to a period p2 of the light intensity pattern outputted from the light detector (step S2). The detected level of the output signal is determined to be included in a predetermined range or not (step S3). If determination is No, by changing a position of an optical element relatively to the scale and light detector, the distance is changed from a virtual spot light source to the scale, and the position of the optical element is adjusted (step S4), and back to step S1, the same process is repeated. The process is stopped when determination is Yes in step S3.

Herein, the light detector is configured to detect a light intensity pattern having a preset specific period (p20). Therefore, if the period p2 is different from the preset period p20, the efficient detection is impossible, and as a result, the level of the output signal is lowered. Thus, by adjusting the position of the optical element in step S4, the level of the output signal can be improved.

Fifth Embodiment

Figure 13:
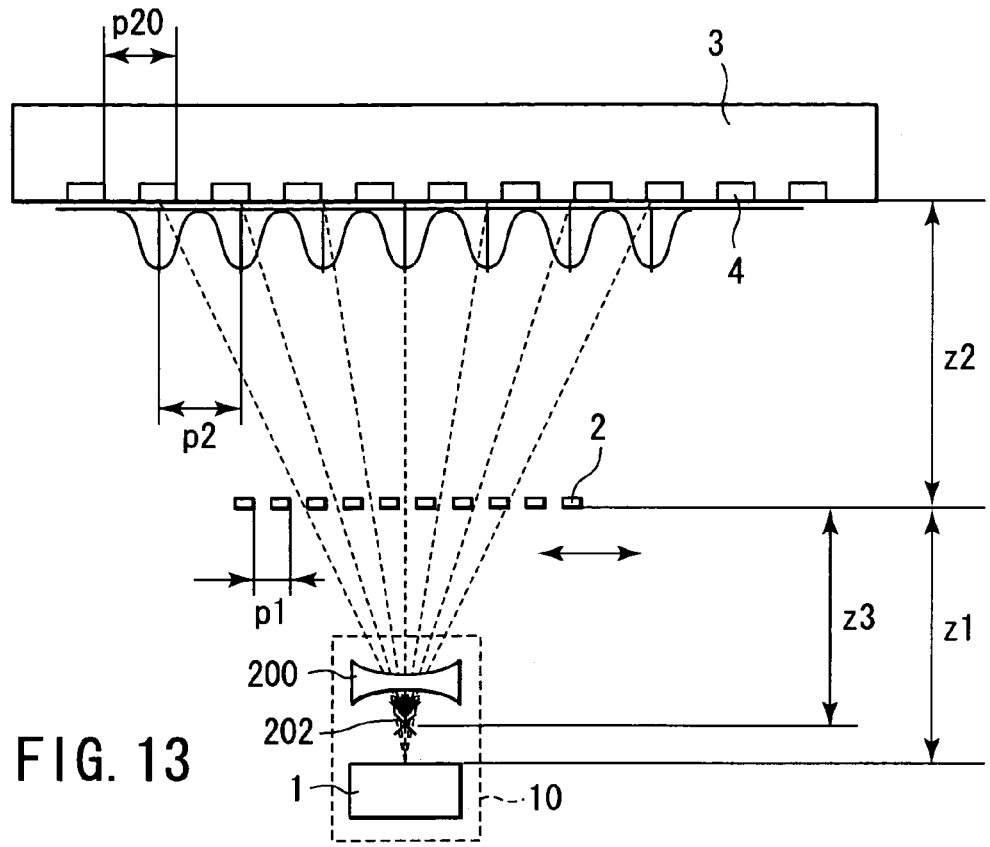
FIG. 13 is a diagram showing a configuration of an optical encoder according to a fifth embodiment of the invention.

A fifth embodiment of the invention is explained. FIG. 13 is a diagram showing an optical encoder in the fifth embodiment of the invention. The optical encoder shown in FIG. 13 is a transmission type optical encoder, and is characterized by disposing a light source 1 and a concave lens 200 as a light source unit 10. The light source 1 is a current confinement type LED which emits a light beam in wavelength of λ, and a scale 2 is a scale having a scale pitch p1, and the concave lens 200 is an optical element for adjusting a beam divergent angle of the light beam emitted from the light source 1 to a specified angle.

The light beam emitted from the light source 1 is directed toward the concave lens 200, and this light beam passes through the concave lens 200, and is emitted toward the scale 2. At this time, the light beam having passed through the concave lens 200 is expanded in its beam divergent angle by this concave lens 200, and it may be assumed that the light source is present at a virtual spot light source position 202 indicated by X. It is known that the Talbot image is formed on the light detector 3 when the positions of the light source 1, scale 2 and light detector 3 are in a specified relation as shown in the formula (1). This Talbot image forms a diffraction interference pattern depending on the phase difference in every path of the light beam when the light beam emitted from the light source 1 reaches onto the light detector 3. Therefore, when the concave lens 200 is inserted in the path of the light beam, approximately, the positional relation of the light source 1, scale 2 and light detector 3 is assumed to be unchanged although it is required to calculate the distance between the light source 1 and the scale 2 in the path of the light beam having passed through the concave lens 200, such as the diffractive index and diffraction angle of the concave lens 200. Practically, by disposing the light source 1, scale 2 and light detector 3 without using the concave lens 200, the positional relation of the members may be adjusted as required on the basis of the output signal from the light detector 3.

On the other hand, the pitch of the diffraction interference pattern of the Talbot image projected on the light detector 3 is calculated according to the formula (2) from the positional relation of the spot light source, scale and light detector because the light beam emitted from the spot light source passes through the slits and forms a light pattern or a dark pattern at position projected on the light detector 3. In this embodiment, since the position of the virtual spot light source is the position indicated by 202 in FIG. 13, it is determined in the following formula (7):

$$P2''=p1(z2+z3)/z3 \qquad (7)$$

where z3 is a distance between the virtual spot light source position 202 by the concave lens 200 and the surface on the scale 2 having the diffraction grating formed thereon, and the virtual spot light source position 200 generally means a back focal point of the concave lens 200;

p2" is a pitch of a diffraction interference pattern of the Talbot image projected on light detector 3 in the case where the concave lens 200 is provided; and other parameters are same as in the first embodiment.

In this configuration, the magnification factor of the Talbot image can be changed without changing the positional relation of the light source 1, scale 2 and light detector 3. Further, the scale 2 of smaller pitch can be used, or an optical encoder of higher resolution can be composed at the same pitch of the light detector.

In this embodiment, the case in which the concave lens 200 is used is described. However, the same effects can be obtained by using a convex lens having the back focal point of the lens located somewhere between the light source 1 and the scale 2.

Figure 14:
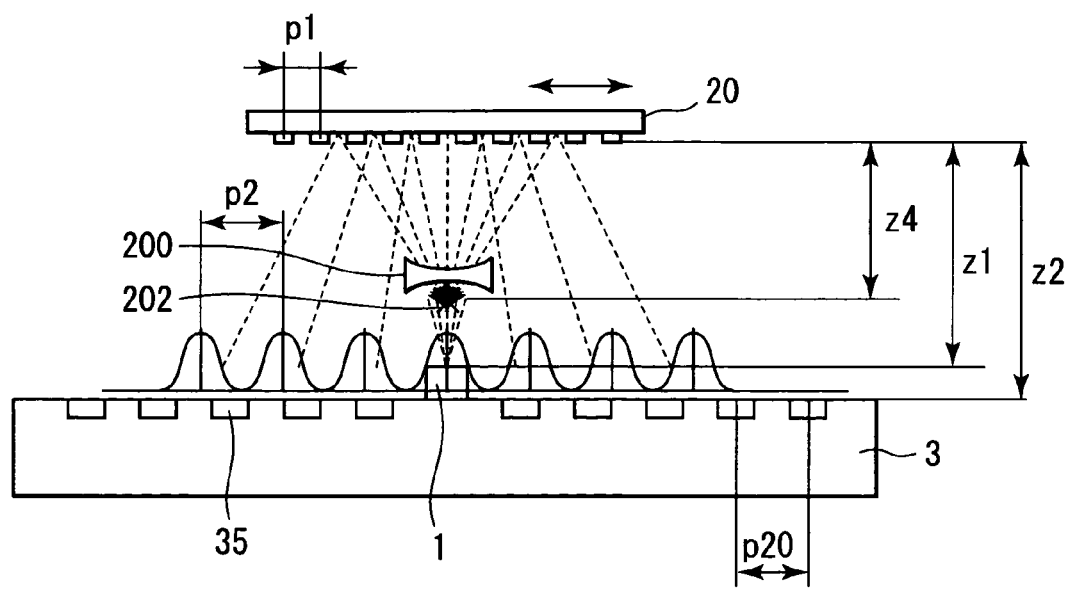
FIG. 14 is a diagram showing a configuration of a reflection type optical encoder as a modified example of the fifth embodiment.

The transmission type optical encoder is explained in the embodiment. However, as shown in FIG. 14, the same configuration is realized in a reflection type optical encoder designed to reflect the light beam emitted from the light source 1 by the scale 20 and detect the reflected beam by the light detector 3 disposed at the same side as the light source 1. Reference numeral 35 is a photo detector 35 of the light detector 3.

Thus, in the reflection type optical encoder, the light beam from the scale 20 enters the portion having an effective optical sensitivity of the photo detector 35 formed on the light detector 3, and it is preferred that the path of this light beam is not shielded by the concave lens 200.

Sixth Embodiment

A sixth embodiment of the invention is described below. The sixth embodiment is differ from the fifth embodiment shown in FIG. 13 in that the concave lens 200 is replaced by a pair of a convex lens and a concave lens, and other configuration is same as in the fifth embodiment shown in FIG. 13.

Figure 15:
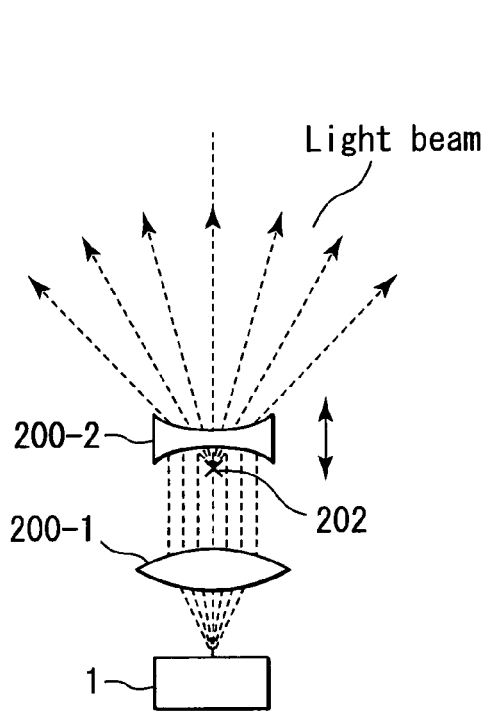
FIG. 15 is a diagram showing the vicinity of a light source 1 of an optical encoder according to a sixth embodiment of the invention.

FIG. 15 is a diagram showing the vicinity of the light source 1 of the optical encoder according to the sixth embodiment. The light beam emitted from the light source 1 is transformed into collimated beam by a collimator lens 200-1, and is directed toward a concave lens 200-2. The collimated beam entering the concave lens 200-2 is expanded to a predetermined beam divergent angle, and is emitted toward the scale 2. The subsequent operation is same as in the fifth embodiment.

In this configuration, even if the concave lens 200-2 moves in the arrow direction in the drawing, the light beam entering the concave lens 200-2 is a collimated beam, and hence there is no change. As a result, there is no change in the divergent angle of the light beam having passed through the concave lens 200-2 or in intensity distribution of light beam, so that a much stable light beam is emitted toward the scale 2.

By such configuration, even if the beam divergent angle of the light source 1 is unstable, the light beam divergent angle emitted to the scale 2 is stable, so that the signal outputted from the light detector 3 is further improved in stability.

In the embodiment, one concave lens and one convex lens are used. However, by using three or more lenses, the position of the virtual spot light source 202 may be adjusted to the scale 2 side from the leading end lens, or the phase difference can be adjusted in each optical path of the light beam emitted from the light source 1 until reaching the light detector 3, so that the contrast of the Talbot image may be further enhanced.

Seventh Embodiment

A seventh embodiment of the invention is described. The seventh embodiment is different from the fifth embodiment in that the concave lens of the optical encoder in the fifth embodiment shown in FIG. 13 is a bar lens having a lens function only in one axial direction as shown in FIG. 16, and other aspects are same as in the fifth embodiment explained in FIG. 13.

Figure 16:
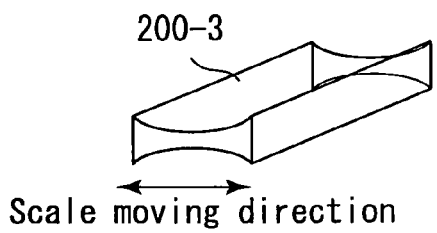
FIG. 16 is a diagram showing a bar lens having a lens function only in one axial direction according to a seventh embodiment of the invention.

A lens 200-3 shown in FIG. 16 is a bar concave lens having a lens function in the moving direction of the scale 2, but not having a lens function in a direction orthogonal to the moving direction of the scale 2 in a plane parallel to the pattern surface of the scale 2.

Figure 17A:
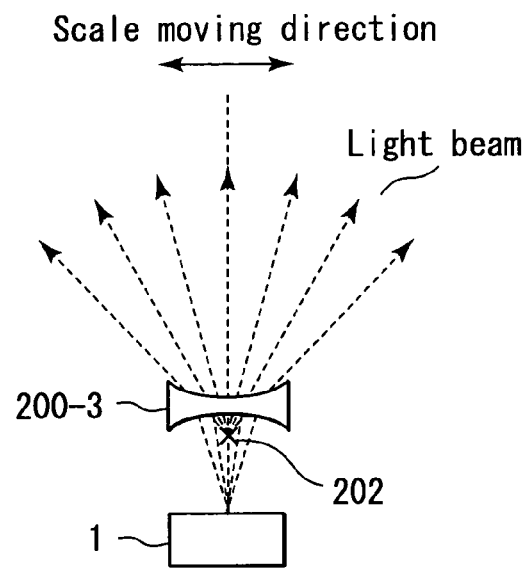
FIGS. 17A and 17B are diagrams explaining the action of the bar lens shown in FIG. 16.
Figure 17B:
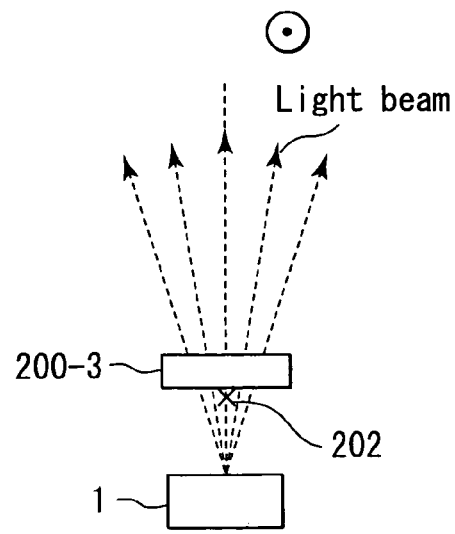

In this configuration, as shown in FIGS. 17A and 17B, since the light beam emitted from the light source 1 is expanded to a desired beam divergent angle in the scale moving direction by the lens 200-3, the magnification factor of the diffraction interference pattern of the Talbot image projected on the light detector 3 can be set to a predetermined value. In the direction orthogonal to the moving direction of the scale 2 in the plane parallel to the pattern surface of the scale 2, since the beam divergent angle is not expanded, the beam intensity of the light beam entering the photo detector 4 on the light detector 3 is not lowered, so that a sufficient intensity can be obtained in the signal detected by the light detector 3.

Figure 18:
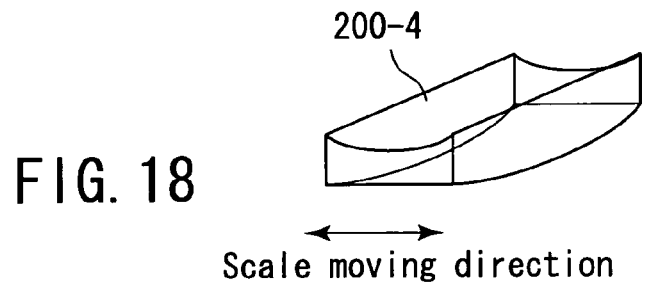
FIG. 18 is a diagram showing a cylindrical lens acting as a concave lens in one direction and acting as a convex lens in a direction orthogonal thereto.
Figure 19A:
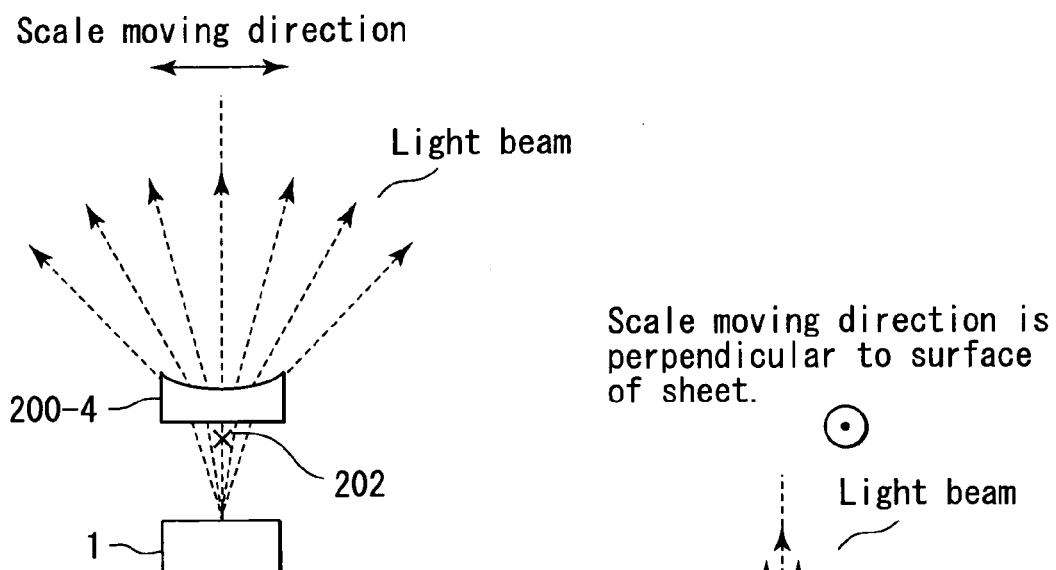
FIGS. 19A and 19B are diagrams explaining the action of the cylindrical lens shown in FIG. 18.
Figure 19B:
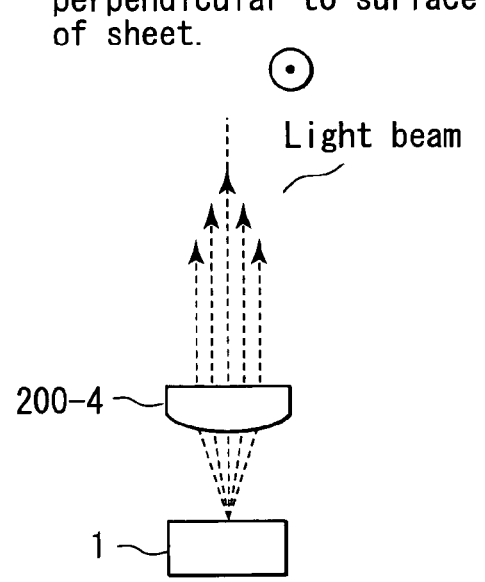

This embodiment uses the cylindrical lens having a lens function in one direction but not having a lens function in a direction orthogonal thereto. However, it is also possible to use a cylindrical lens 200-4 acting as a concave lens in one direction and acting as a convex lens in a direction orthogonal to the one direction as shown in FIGS. 18, 19A and 19B. In this configuration, without spoiling the function of the embodiment, in the direction orthogonal to the moving direction of the scale 2 in the plane parallel to the pattern surface of the scale 2, the light beam can be focused and entered in the photo detector 4 on the light detector 3, so that the signal intensity detected by the light detector 3 can be further enhanced.

Eighth Embodiment

Figure 20:
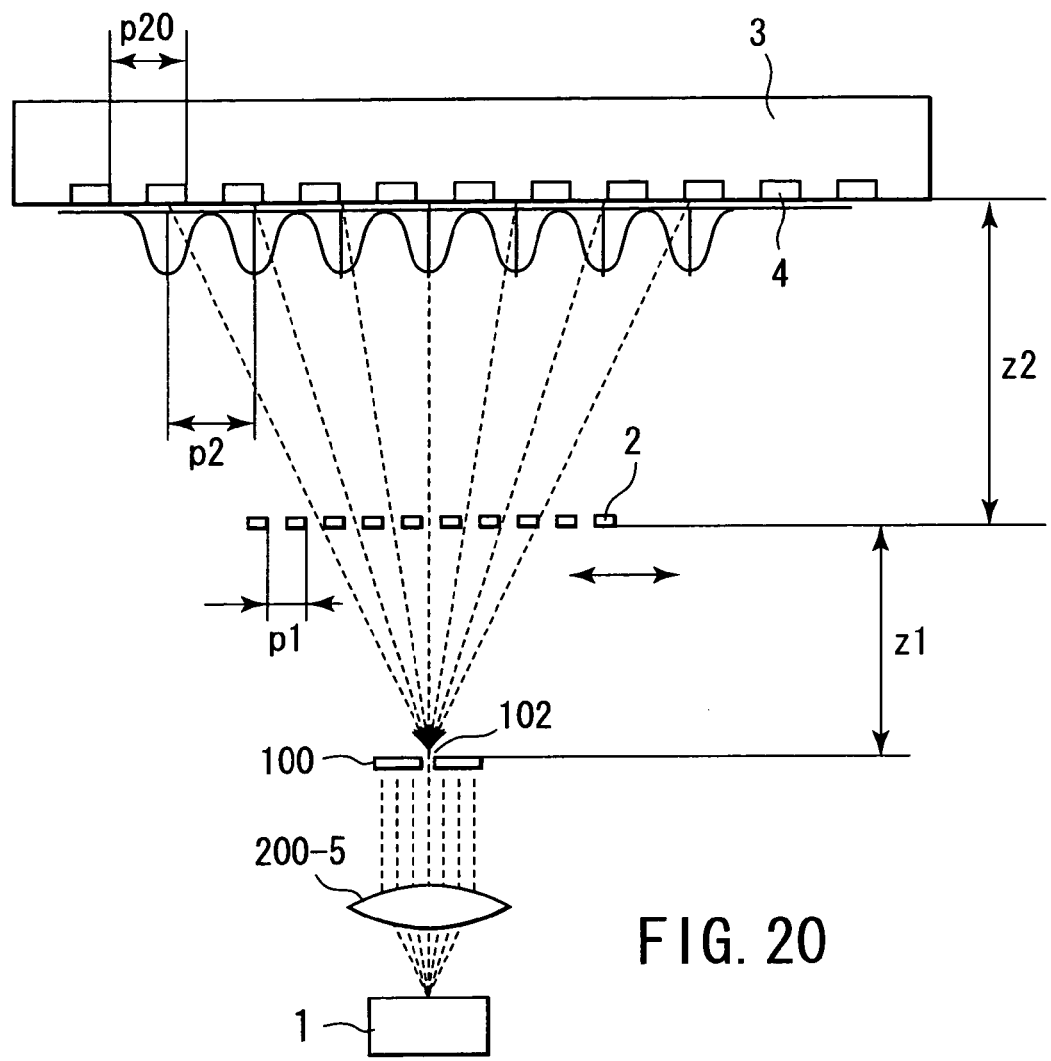
FIG. 20 is a diagram showing a configuration of an optical encoder according to an eighth embodiment of the invention.

An eighth embodiment of the invention is described below. FIG. 20 is a diagram showing a configuration of an optical encoder according to the eighth embodiment of the invention. This embodiment is different from the first embodiment in that a light source unit 10 has a light source 1, slits 100, and a collimating lens 200-5, but other aspects are same as in the first embodiment.

In this embodiment, the light beam emitted from the light source 1 is transformed into collimated beam by the collimating lens 200-5. The collimated beam is emitted to the slits 100, and the light beam having passed through the opening 102 of the slits 100 is emitted toward the scale 2. At this time, the position of the virtual spot light source coincides with the slit opening 102.

In the embodiment, since the light beam emitted from the light source is transformed into collimated beam by the lens 200-5, even if the slits 100 are moved in the vertical direction in the diagram, the intensity of the light beam passing through the slit opening 102 is constant. Accordingly, even if the slits 100 are moved, the light intensity of the Talbot image detected by the light detector 3 is not changed.

Therefore, by composing as in the embodiment, even in the case where the magnification factor of the Talbot image formed on the light detector 3 is adjusted by moving the slits 100 in the vertical direction in the diagram, the light intensity of the Talbot image detected by the photo detector 4 of the light detector 3 is constant, so that the magnification factor can be adjusted more stably.

Figure 21A:
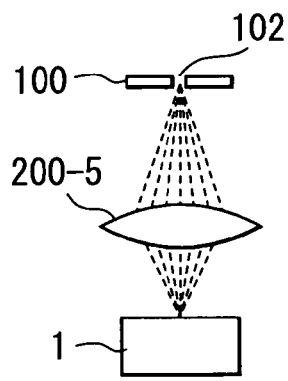
FIGS. 21A and 21B are diagrams showing a modified example of the light beam emitted from the light source 1.
Figure 21B:
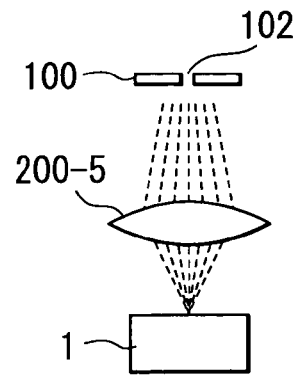

In the embodiment, the light beam emitted from the light source 1 is transformed into collimated beam by using the lens 200-5. However, as shown in FIG. 21A, by composing so as to focus in the vicinity of the slit opening 102, the light intensity of the Talbot image detected by the light detector 3 can be increased. Further, as shown in FIG. 21B, by slightly reducing the collimated beam shape, the adjustment allowance of the slits 100 can be increased, and the light intensity of the Talbot image can be increased at the same time.

Ninth Embodiment

A ninth embodiment of the invention is described. The ninth embodiment of the invention is basically same as the configuration shown in FIG. 25, except that the light source 1 herein is a current confinement type LED having a light beam exit window width WLs as shown in FIG. 4. The light beam exit window width WLs is defined in the following range according to the formula (6).

$$P1 \times (2n-1.5) \times \frac{z1+z2}{2z2} \leq WLs \leq P1 \times (2n-0.5) \times \frac{z1+z2}{2z2} \quad (8)$$

In this configuration, the light beam exit window width WLs of the light source 1 is not always required to be smaller than the scale pitch p1, and even when the same light source 1 is used, it is applicable to the scale 2 having a scale pitch p1 in a wide range satisfying the above formula (8).

In the case of z1=z2, the formula (8) can be rewritten as follows.

$$p1 \times (2n-1.5) \leq WLs \leq p1 \times (2n-0.5) \quad (8')$$

Further, by defining the light beam exit window width WLs in the moving direction of the scale 2 at p1×(z +z2) / (2×z2) or less, or at about p1×(2n−1)×(z1+z2) / (2×z2), a Talbot image of higher contrast can be formed.

Herein, if WLs is out of the range of the formula (8), the signal level deteriorates, but does not deteriorate immediately to an impractical level. Therefore, preferably, WLs is in the range of the formula (8), but its function is not lost immediately even if slightly going out of the range. Hence, it is sufficient that WLs is approximately included in this range.

In the embodiment, the light source may be a semiconductor laser of surface emission type, and the same effects can be obtained.

Further, by using the light emitting element having plural light beam exit windows at positions of (z1+z2)/z2×n times of the scale pitch p1, a Talbot image of a much larger contrast can be obtained. In particular, it is easier to fabricate an array in the LED, surface-emitting laser, and other surface-emitting elements, and it is particularly preferred because the positional relation of the light beam exit windows can be fabricated correctly.

Tenth Embodiment

Figure 22:
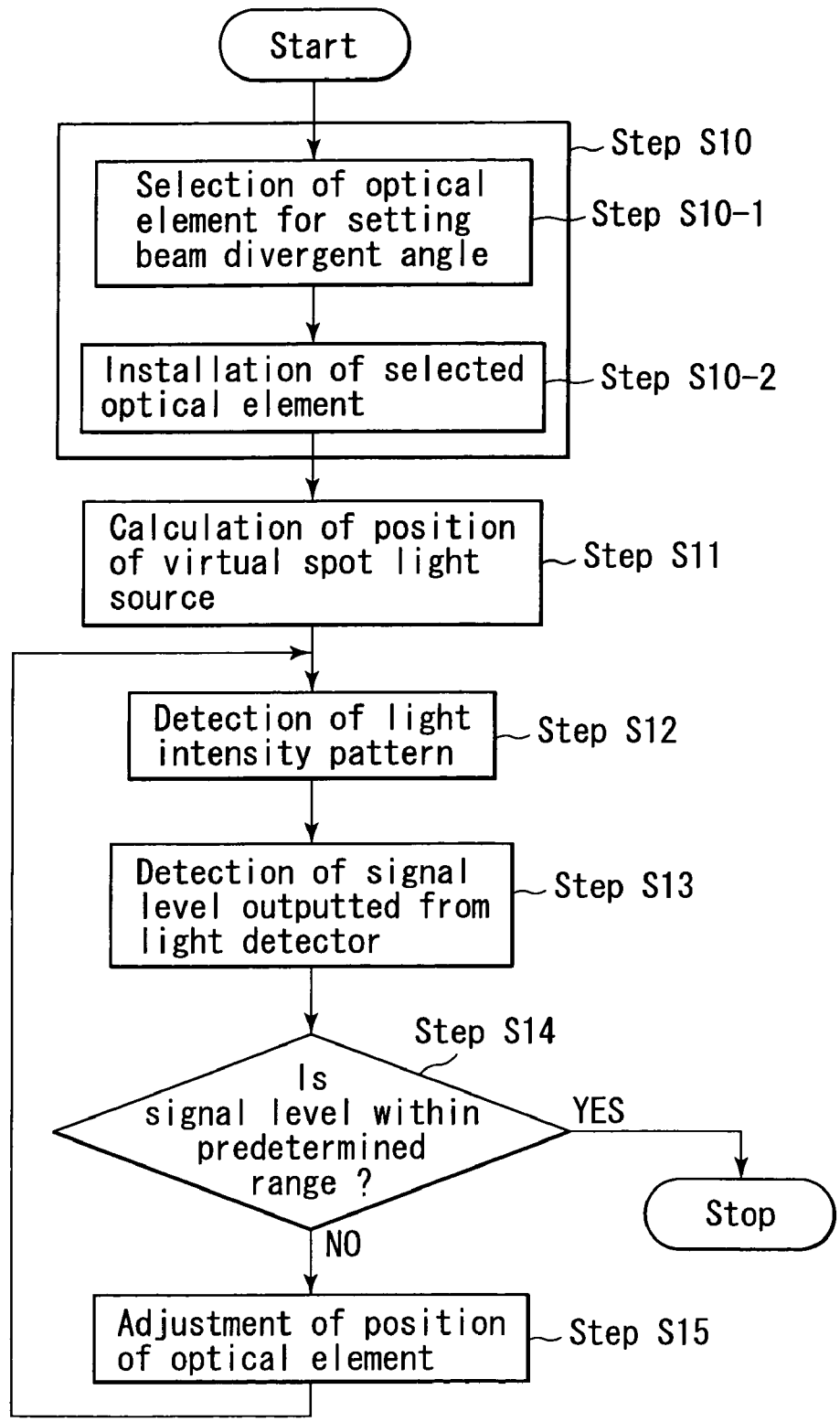
FIG. 22 is a diagram explaining an adjusting method according to a ninth embodiment of the invention.
Figure 23:
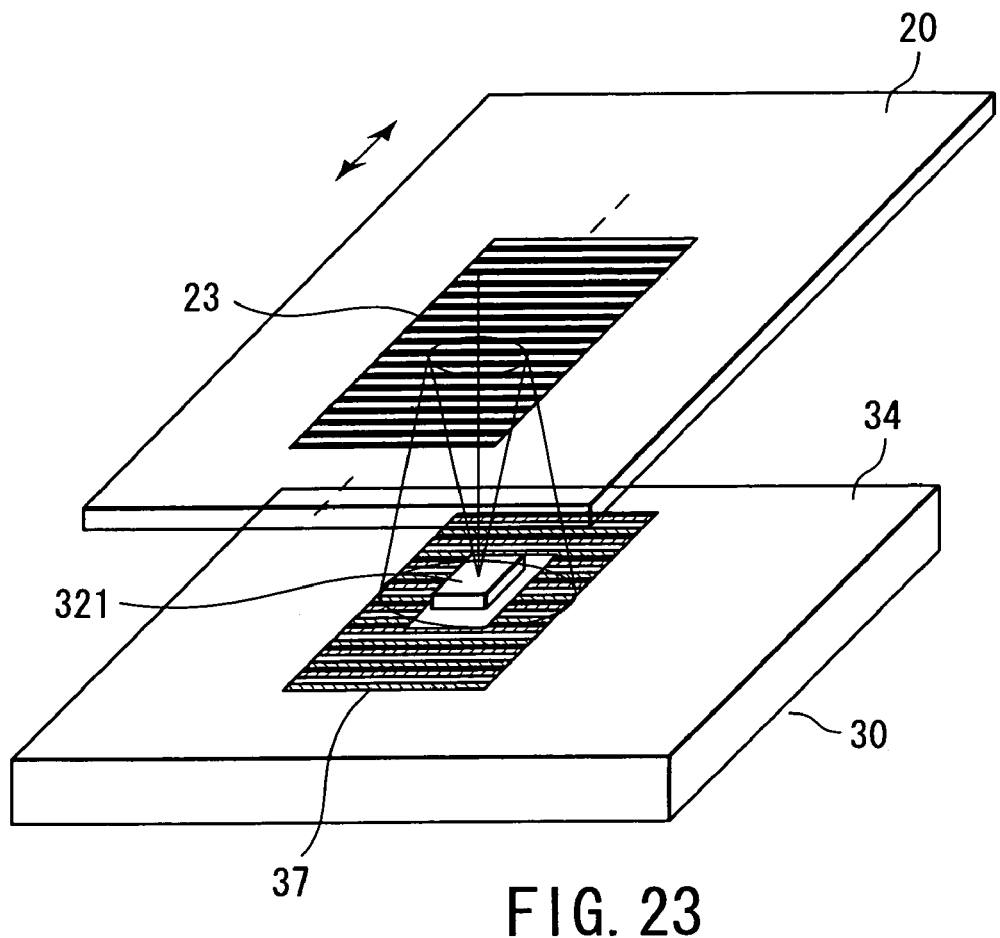
FIG. 23 is a diagram showing a configuration of a typical optical encoder in a prior art.
Figure 24:
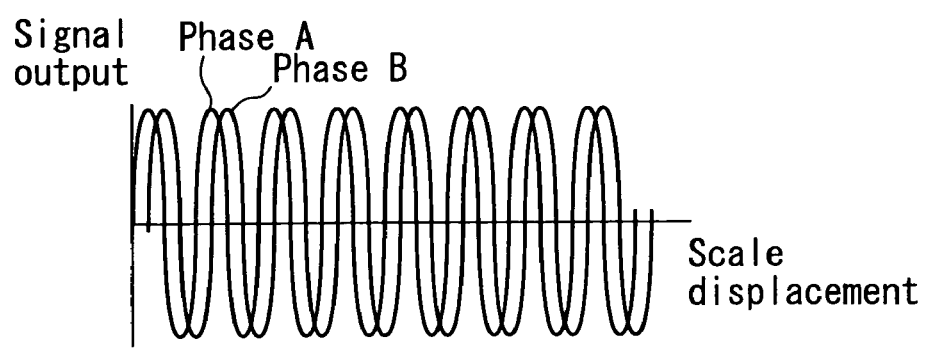
FIG. 24 is a diagram showing a waveform of a detection signal showing the moving distance of a scale.

A tenth embodiment of the invention is described. The tenth embodiment of the invention relates to a method of adjusting a level of an output signal of a light detector depending on a period p2 of a diffraction interference pattern by using an optical element for setting a beam divergent angle of a light beam emitted from a light source to a predetermined value. FIG. 22 is a flowchart explaining the detail of such an adjusting method. First, a beam divergent angle of a light beam from a light source is set to a predetermined value (step S10). More specifically, an optical element for setting a specified beam divergent angle is selected (step S10-1). The selected optical element is placed between the light source and the scale (step S10-2). From the set beam divergent angle, a position of a virtual spot light source is calculated (step S11). A diffraction interference pattern formed on a receiving surface of a light detector is detected (step S12). Next, a signal level of an output signal is detected depending on a period p2 of the diffraction interference pattern outputted from the light detector (step S13). Thereafter, the signal level of the detected output signal is determined to be included in a predetermined range or not (step S14). If determination is No, by changing a position of the optical element relating to the scale and light detector, the distance from the position of the virtual spot light source to the scale is changed, and the position of the optical element is adjusted (step S15), and back to step S10, the same process is repeated. When determination is Yes in step S14, the process is stopped.

In all foregoing embodiments described herein, the interference light source may be realized by a surface-emitting laser, a stripe type semiconductor laser, a current confinement type LED, an ordinary LED, and any other coherent light source.

In several embodiments of the invention, the slits 100 and the light beam exit window of the light source 1 are disposed apart from each other at a specific distance, but the slits 100 may be in contact with the exit window of the light source, or may be formed by patterning an upper electrode of the light source or the like.

The lens shown in the embodiments of the invention includes a general lens shaped from glass or plastics, a Fresnel type diffractive lens, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical encoder comprising:
a light source unit;
a scale which has a periodic optical pattern and displaces relatively to the light source unit in a scale moving direction; and
a light detector to detect a light beam emitted from a light source of the light source unit and traveled by way of the scale;
wherein the light source unit has a light beam exit opening through which a light beam is emitted toward the scale; and
assuming that a distance between the light beam exit opening and the scale is z1, a distance between the scale and the light detector is z2, and a pitch of the periodic optical pattern of the scale is p1;
wherein the width W of the light beam exit opening in the scale moving direction is specified as follows:

$$p1\times(2n-1.5)\times(z1+z2)/(2\times z2) \leq W \leq p1\times(2n-0.5)\times(z1+z2)/(2\times z2)$$

where n is a natural number and the values of z1 and z2 are substantially equal to each other.

2. An optical encoder comprising:
a light source unit;
a scale which has a periodic optical pattern and displaces relatively to the light source unit in a scale moving direction; and
a light detector to detect a light beam emitted from a light source of the light source unit and traveled by way of the scale;
wherein the light source unit has a light beam exit opening through which a light beam is emitted toward the scale, and
assuming that a distance between the light beam exit opening and the scale is z1, a distance between the scale and the light detector is z2, and a pitch of the periodic optical pattern of the scale is p1;
wherein the width W of the light beam exit opening in the scale moving direction is specified as follows:

$$p1\times(2n-1.5)\times(z1+z2)/(2\times z2) \leq W \leq p1\times(2n-0.5)\times(z1+z2)/(2\times z2)$$

where n is a natural number and one or more light beam exit openings are disposed in the scale moving direction at a position of $(z1+z2)/z2 \times m$ (where m is a natural number) times of the pitch p1 of the periodic optical pattern of the scale.

3. The optical encoder according to claim 2, wherein the light beam exit opening of the light source unit is a light beam exit window formed on a light beam emission surface of the light source, and the width W of the light beam exit opening in the scale moving direction is the width WLs of the light beam exit window in the scale moving direction.

4. The optical encoder according to claim 2, wherein the light beam exit opening of the light source unit is an optical element disposed on an optical path of a light beam from the light source toward the scale and transmitting a predetermined portion of the light beam.

5. The optical encoder according to claim 4, wherein the optical encoder is configured to satisfy approximately the relation of $1/z1+1/z2=\lambda/(n(p1)^2)$, where $\lambda$ is a wavelength of the light beam emitted from the light beam exit opening; and n is a natural number.

6. The optical encoder according to claim 4, wherein the optical element transmitting the predetermined portion of the light beam is a slit having a light transmitting portion and a light shielding portion, and the width W of the light beam exit opening in the scale moving direction is the width Ws of the slit in the scale moving direction.

7. The optical encoder according to claim 6, wherein the slit has a plurality of openings in the scale moving direction, and said plurality of openings are disposed at positions of about integer times of the pitch p2 of the light detector.

8. The optical encoder according to claim 6, wherein the light source unit further has a lens which sets a beam divergent angle of the light beam to a predetermined value.

9. The optical encoder according to claim 6, wherein the optical element transmitting the predetermined portion of the light beam is disposed such that the light beam emitted from the light source unit is reflected by the scale, and then does not shield an optical path from the scale toward a region of the light detector having an effective reception sensitivity.

10. The optical encoder according to claim 6, further comprising a plurality of photo detectors which detect a predetermined phase portion of a light intensity pattern on a receiving surface of the light detector formed when the light beam emitted from the light source unit and passing through the scale impinges upon the receiving surface.

11. The optical encoder according to claim 6, the photo detector of the light detector is configured to be capable of detecting a predetermined phase portion of a light intensity pattern having a pitch of about $p1 \times (z1+z2)/z1$.

12. The optical encoder according to claim 4, wherein the optical element transmitting the predetermined portion of the light beam is a slit having a circular opening, and the width W of the light beam exit opening in the scale moving direction is a diameter Ws of the circular opening.

13. The optical encoder according to claim 12, wherein the circular opening is plural, and the plurality of circular openings are disposed, in a plane parallel to a pattern surface of the scale, in a direction orthogonal to the scale moving direction.

14. An optical encoder comprising:
a light source unit;
a scale which has a periodic optical pattern and displaces relatively to the light source unit in a scale moving direction; and a light detector to detect a light beam emitted from a light source of the light source unit and traveled by way of the scale;

wherein the light source unit has a light beam exit opening through which a light beam is emitted toward the scale; and assuming that a distance between the light beam exit opening and the scale is z1, a distance between the scale and the light detector is z2, and a pitch of the periodic optical pattern of the scale is p1;

wherein the width W of the light beam exit opening in the scale moving direction is p1×(z1+z2)/(2×z2) or less and one or more light beam exit openings are disposed in the scale moving direction at positions of (z1+z2)/z2×m (where m is an integer of 1 or more) times of the pitch p1 of the periodic optical pattern of the scale.

15. The optical encoder according to claim 14, wherein the light beam exit opening of the light source unit is a light beam exit window formed on a light beam emission surface of the light source, and the width W of the light beam exit opening in the scale moving direction is the width WLs of the light beam exit window in the scale moving direction.

16. The optical encoder according to claim 14, wherein the light beam exit opening of the light source unit is an optical element disposed on an optical path of a light beam from the light source toward the scale and passing through a predetermined portion of the light beam.

17. The optical encoder according to claim 16, wherein the optical encoder is configured to satisfy approximately the relation of $1/z1+1/z2=\lambda/(n(p1)^2)$, where $\lambda$ is a wavelength of the light beam emitted from the light beam exit opening and n is a natural number.

18. The optical encoder according to claim 16, wherein the optical element transmitting the predetermined portion of the light beam is a slit having a light transmitting portion and a light shielding portion, and the width W of the light beam exit opening in the scale moving direction is the width Ws of the slit in the scale moving direction.

19. A method of adjusting an output signal level depending on a period p2 of a light intensity pattern formed on a receiving surface of a light detector; in an optical encoder comprising: a light source unit; an optical element of the light source unit, which causes a predetermined portion of a light beam emitted from a light source to pass therethrough; a scale which has a periodic optical pattern and displaces relatively to the light source unit; and a light detector to detect a light beam emitted from the light source unit and traveled by way of the scale, the method comprising:
(i) a step of detecting a light intensity pattern formed on the receiving surface of the light detector;
(ii) a step of checking a level of the output signal depending on the period p2 of the light intensity pattern detected by the light detector;
(iii) a step of determining whether or not the level of the output signal is included in a predetermined range; and
(iv) a step of, when the level of the output signal is not included in the predetermined range of the signal level, changing a distance from the optical element to the scale, wherein the steps from (i) to (iv) are repeated to adjust the output signal level.

20. An optical encoder comprising:
a light source unit;
a scale which has a periodic optical pattern and dislocates relatively to the light source unit; and
a light detector to detect a light beam emitted from the light source unit and traveled by way of the scale.
wherein the light source unit has an optical unit which sets a beam divergent angle of the light beam to a predetermined value, the optical element which sets a beam divergent angle of the light beam to a predetermined value is a lens and wherein the lens is a cylindrical lens having a focusing action only in the scale moving direction.

21. The optical encoder according to claim 20, wherein the lens has a function of expanding the beam divergent angle of the light beam lens in the scale moving direction, and has a function of focusing the beam divergent angle of the light beam in a plane orthogonal to the scale moving direction and parallel to the scale pattern.

22. A method of adjusting a level of an output signal depending on a period p2 of a light intensity pattern formed on a receiving surface of a light detector, in an optical encoder comprising: a light source unit; a scale which has a periodic optical pattern and displaces relatively to the light source unit; and a light detector to detect a light beam emitted from the light source unit and traveled by way of the scale, the method comprising:
(i) a step of setting a beam divergent angle of a light beam emitted from a light source of the light source unit to a predetermined value;
(ii) a step of calculating a position of a virtual spot light source from the set beam divergent angle;
(iii) a step of detecting a light intensity pattern formed on the surface of the light detector;
(iv) a step of checking the level of the output signal depending on the period p2 of the light intensity pattern detected by the light detector;
(v) a step of determining whether or not the level of the output signal is included in a predetermined range; and
(vi) a step of terminating the adjustment when the level of the output signal is included in the predetermined range of the output signal, and changing the distance from the calculated position of the virtual spotlight source to the scale when the level of the output signal is not included in the predetermined range of the signal level,
wherein the steps from (iii) to (vi) are repeated to adjust the output signal level.

* * * * *